Feb. 18, 1930.                B. M. SHIPLEY                1,747,397
                              CASH REGISTER
                          Filed Jan. 16, 1924         20 Sheets-Sheet 1
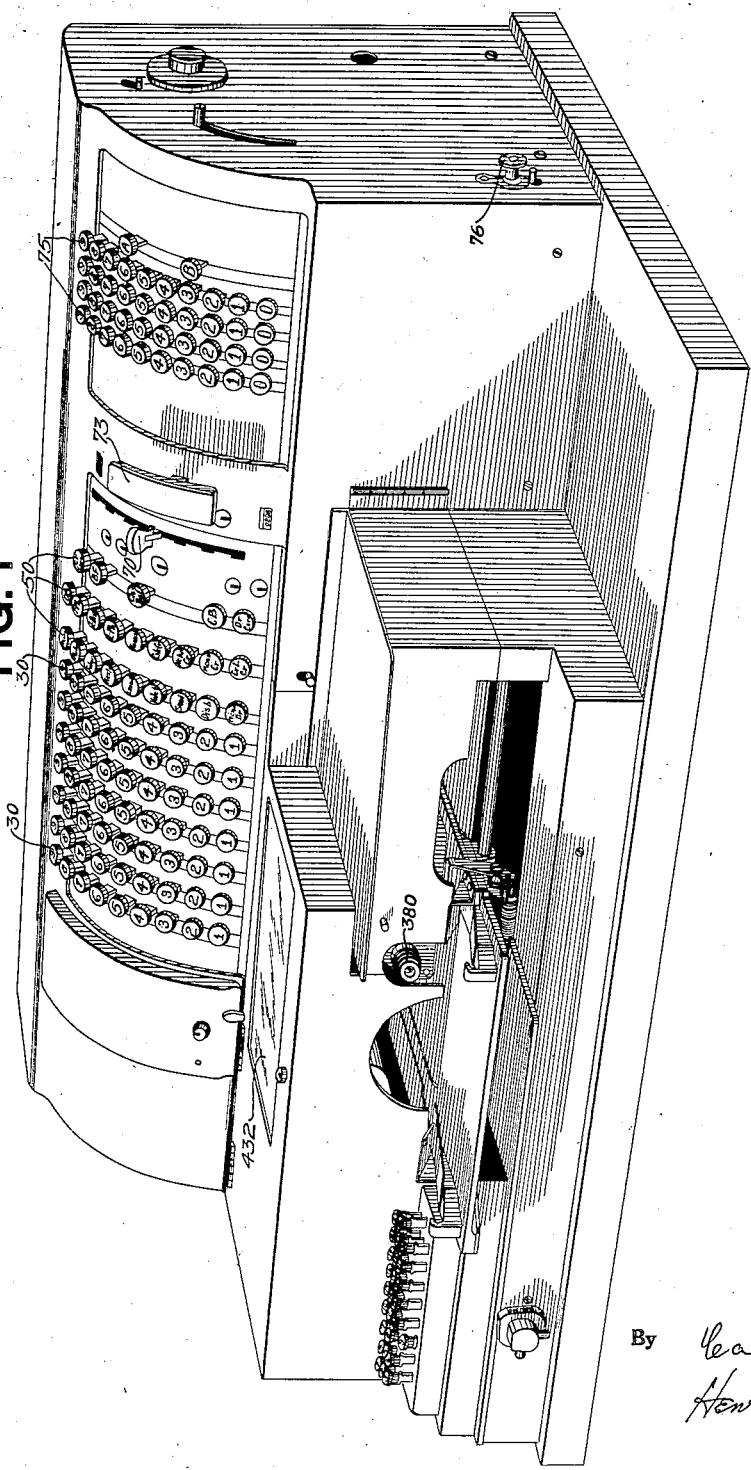
Inventor
Bernis M. Shipley
By Carl Beust
   Henry E. Stauffer
His Attorneys Feb. 18, 1930.   B. M. SHIPLEY   1,747,397
CASH REGISTER
Filed Jan. 16, 1924   20 Sheets-Sheet 2
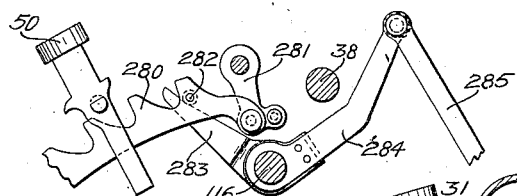
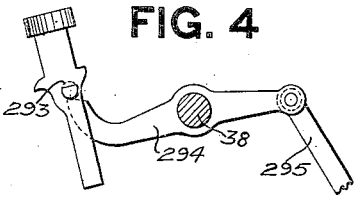
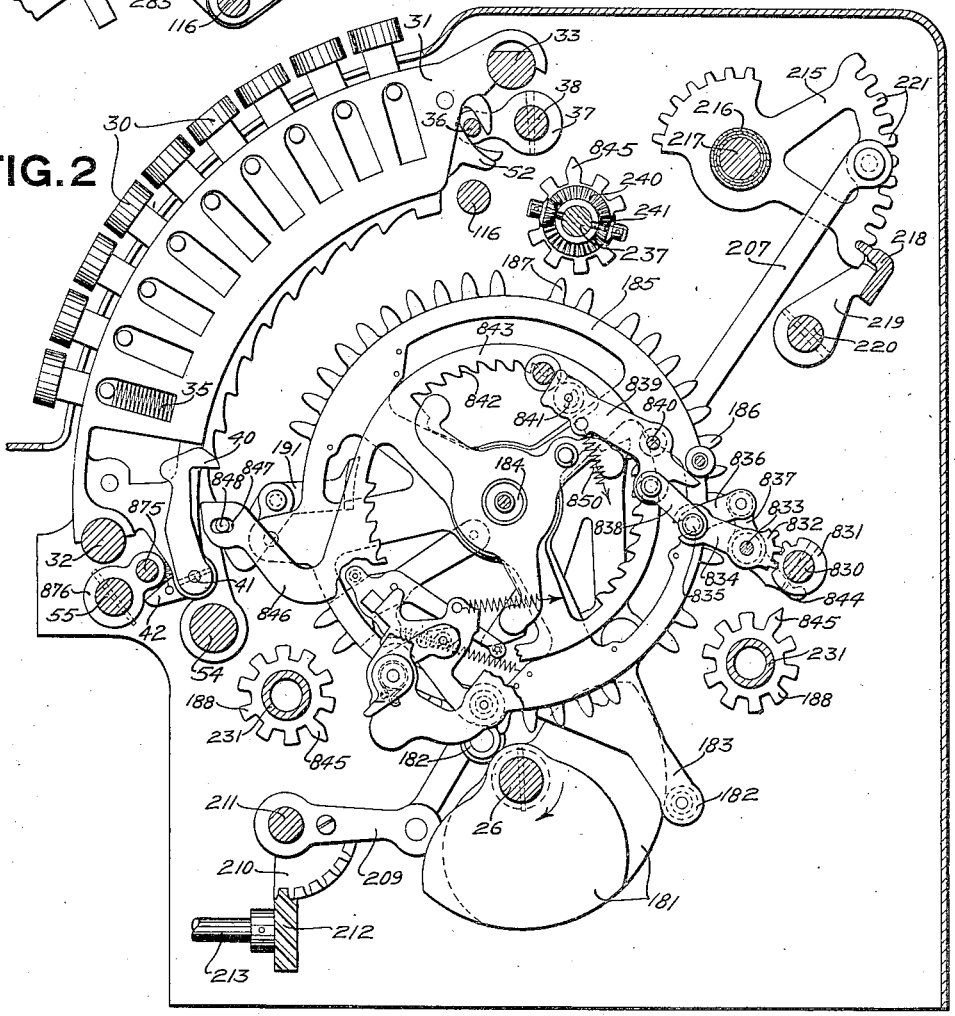
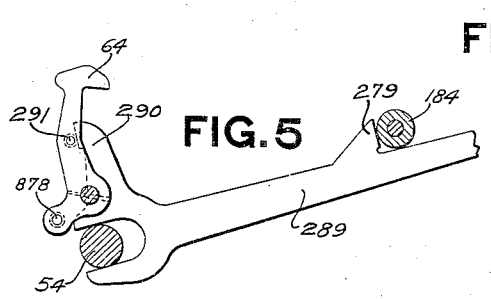
Inventor
Bernis M. Shipley
By Carl Beust
Henry C. Stauffer
His Attorneys Feb. 18, 1930. B. M. SHIPLEY 1,747,397
CASH REGISTER
Filed Jan. 16, 1924 20 Sheets-Sheet 3

Inventor
Bernis M. Shipley
By Earl Beust
Henry E. Stauffer
His Attorneys

Feb. 18, 1930.                B. M. SHIPLEY                1,747,397
                              CASH REGISTER
                           Filed Jan. 16, 1924        20 Sheets-Sheet 4
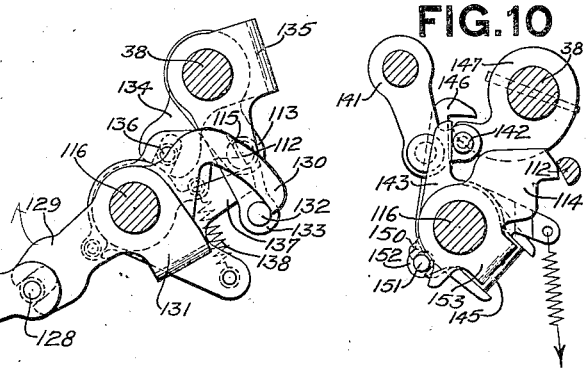
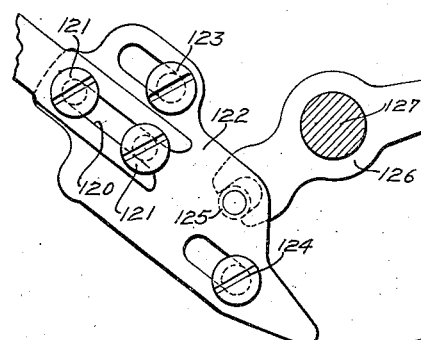
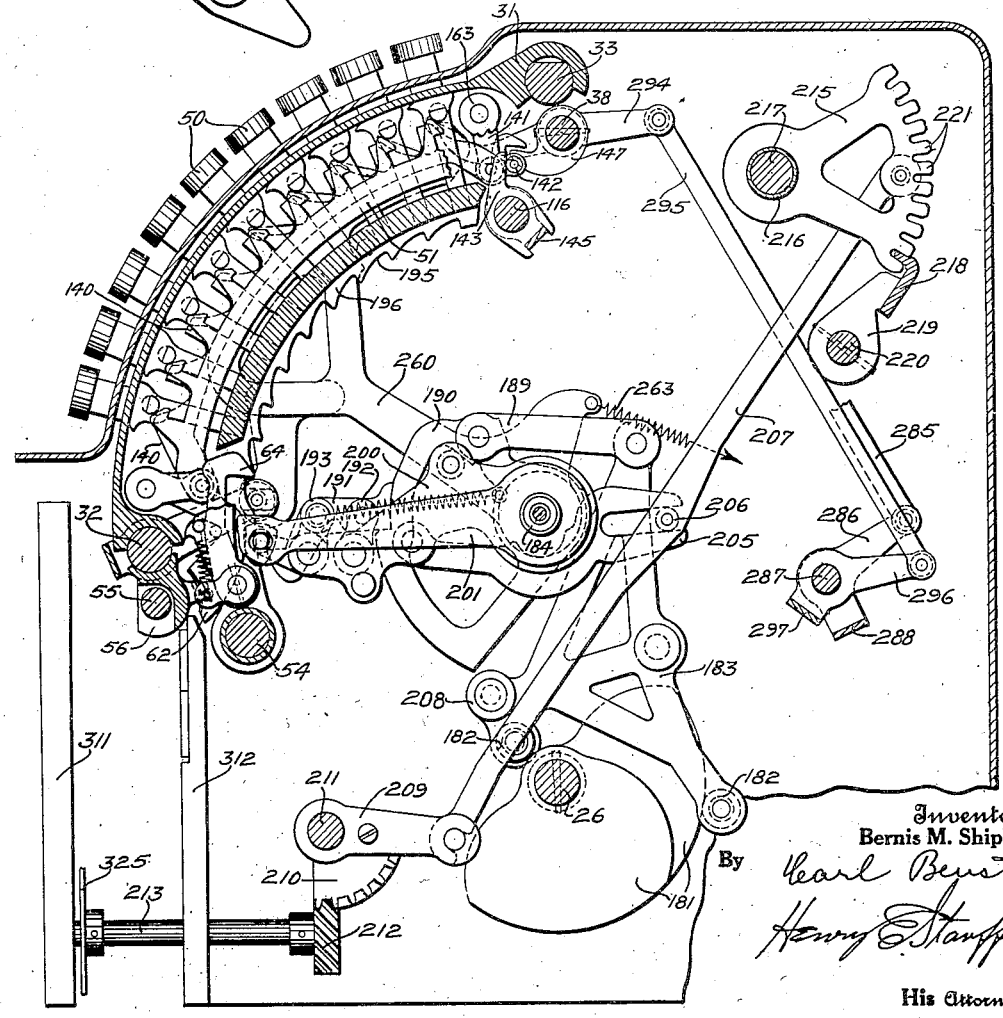
Inventor
Bernis M. Shipley
By
His Attorneys Feb. 18, 1930.  B. M. SHIPLEY  1,747,397
CASH REGISTER
Filed Jan. 16, 1924  20 Sheets-Sheet 5
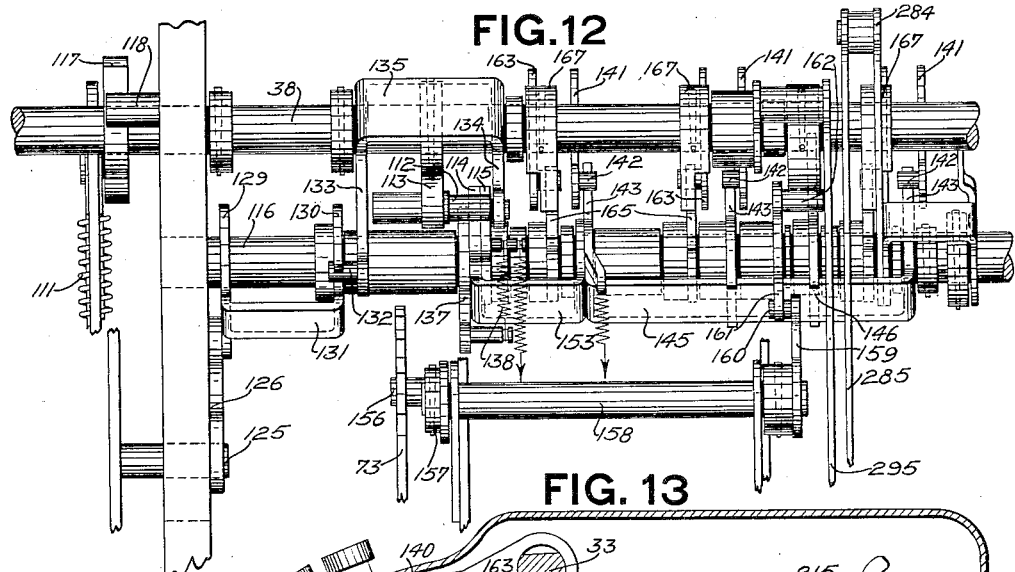
Inventor
Bernis M. Shipley
By Carl Beust
Henry E. Stauffer
His Attorneys

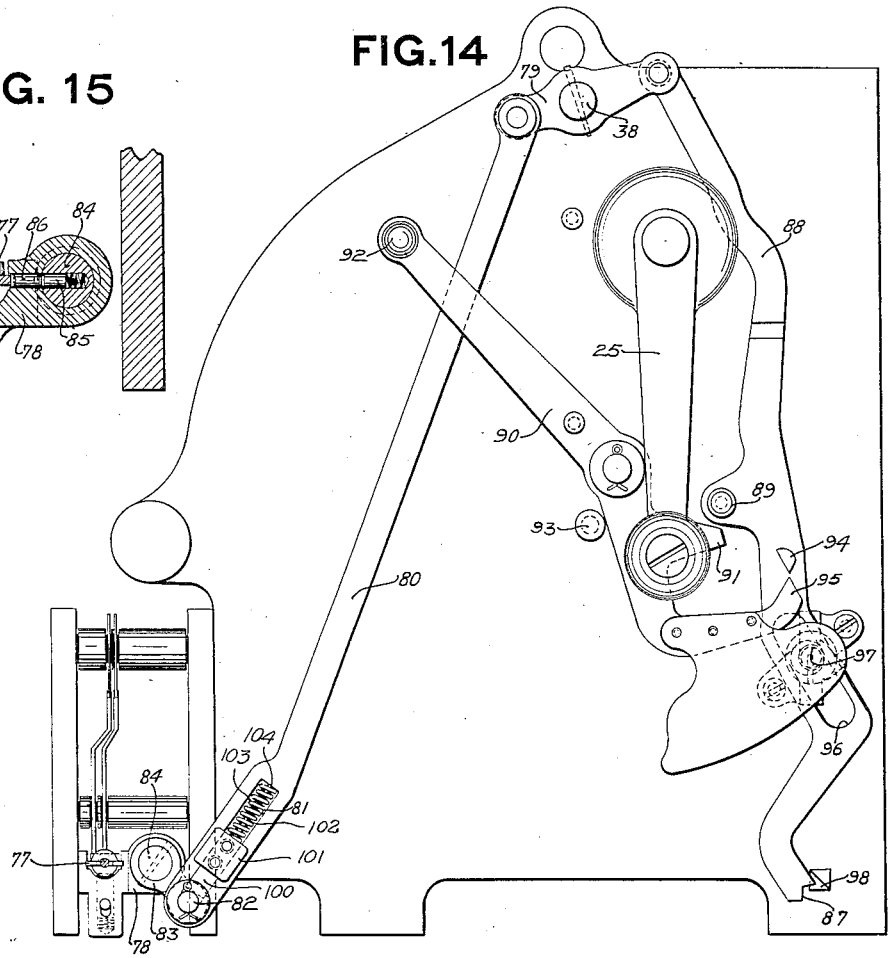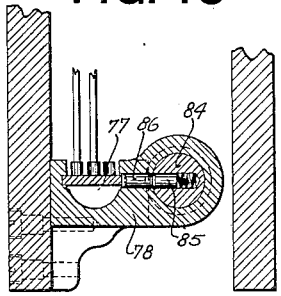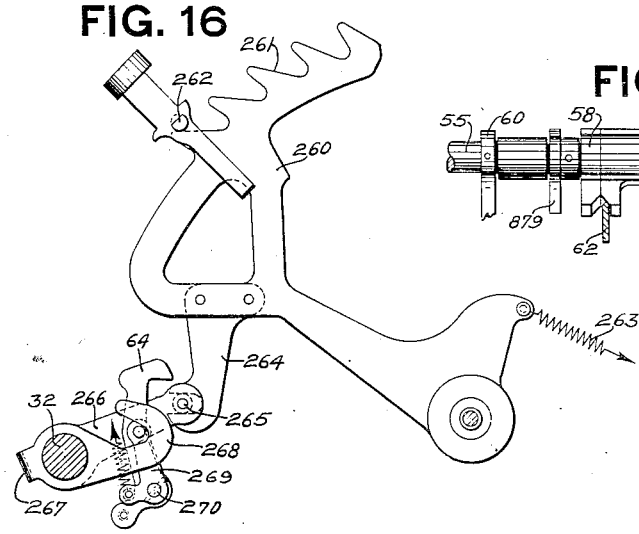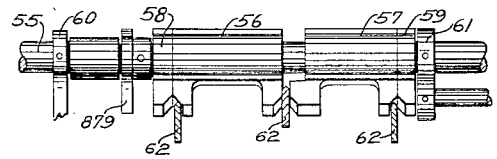

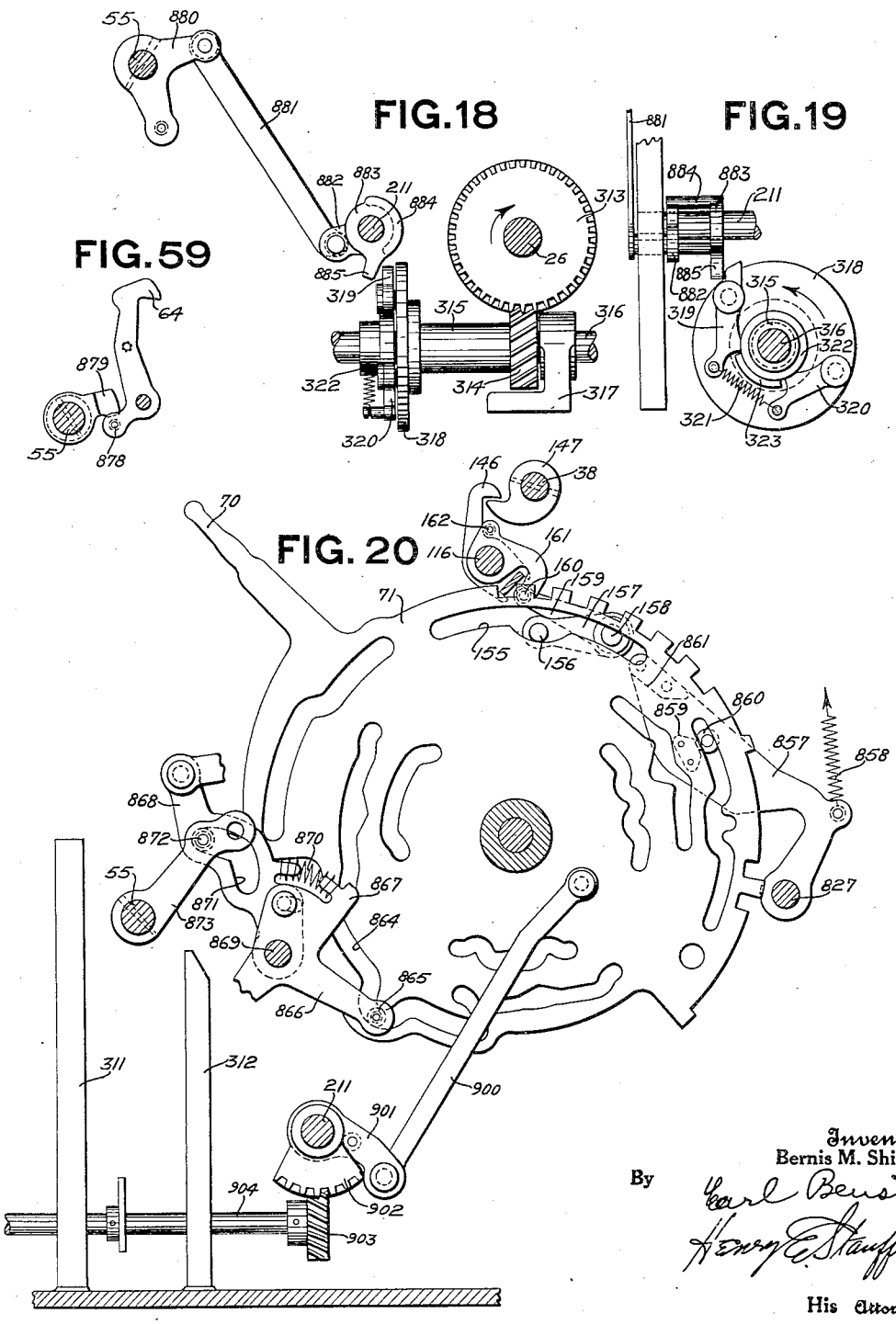

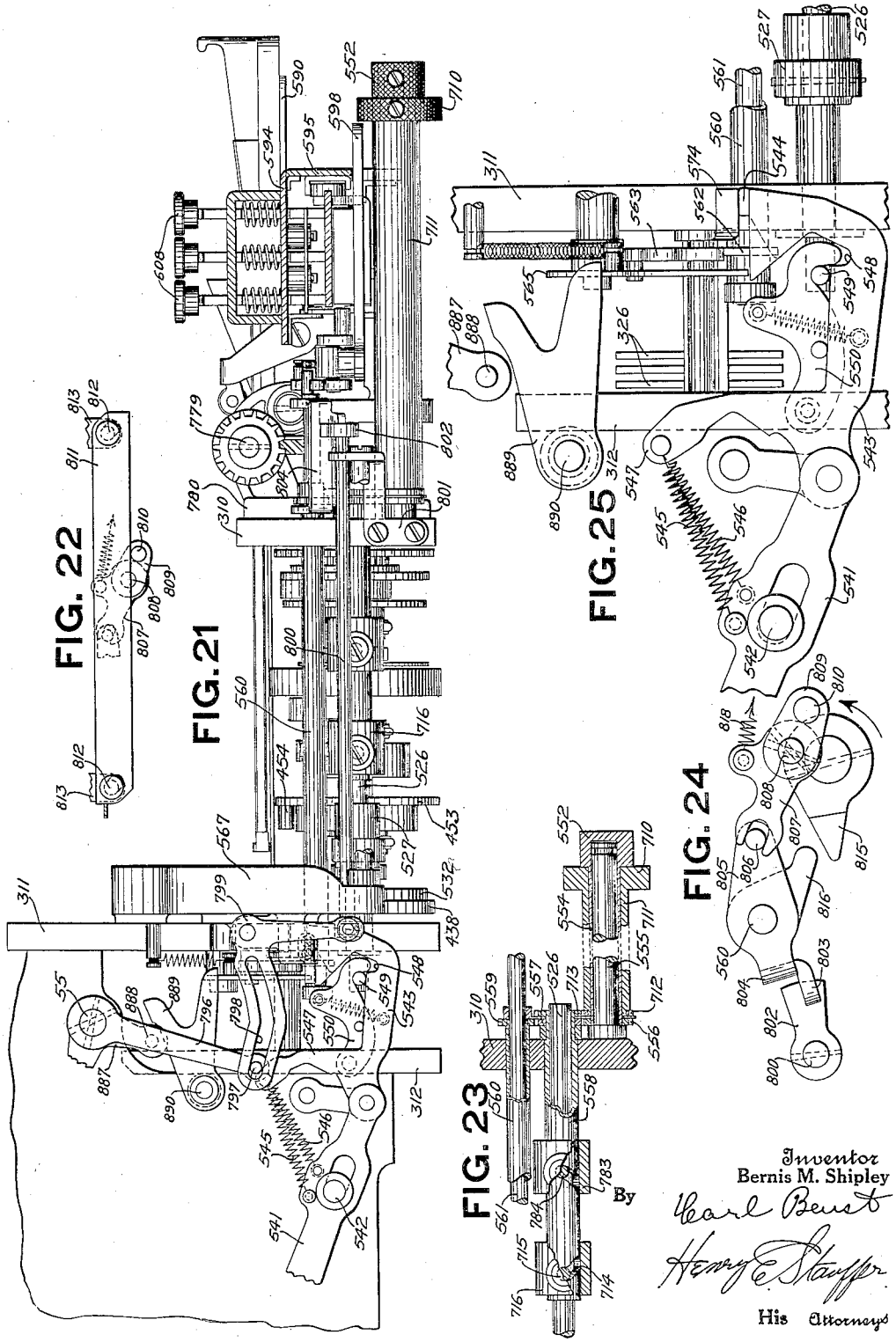

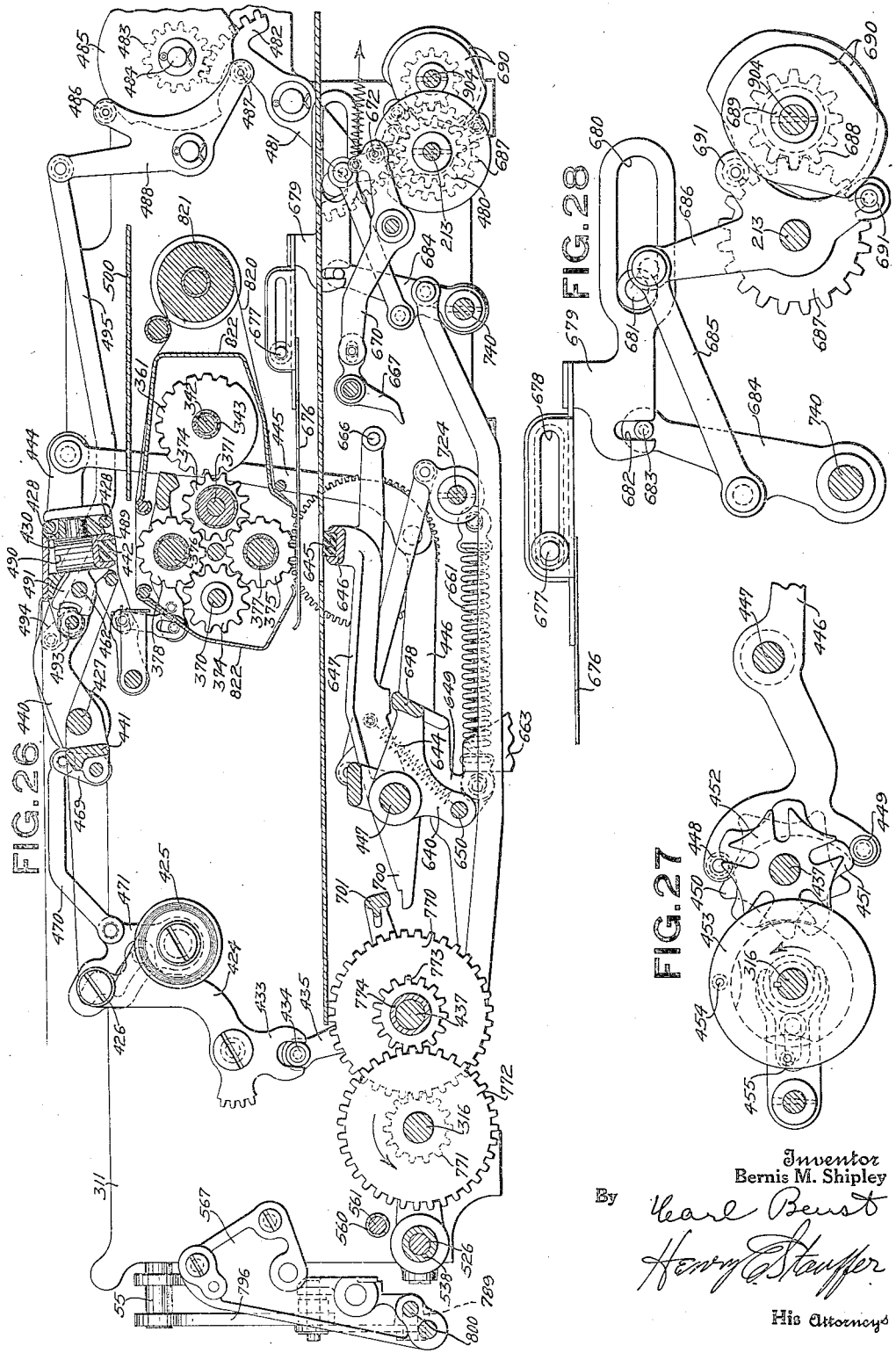

Feb. 18, 1930.     B. M. SHIPLEY     1,747,397
CASH REGISTER
Filed Jan. 16, 1924     20 Sheets-Sheet 10
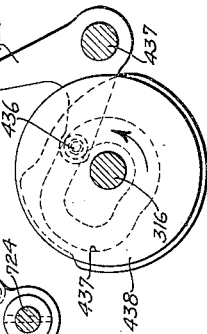
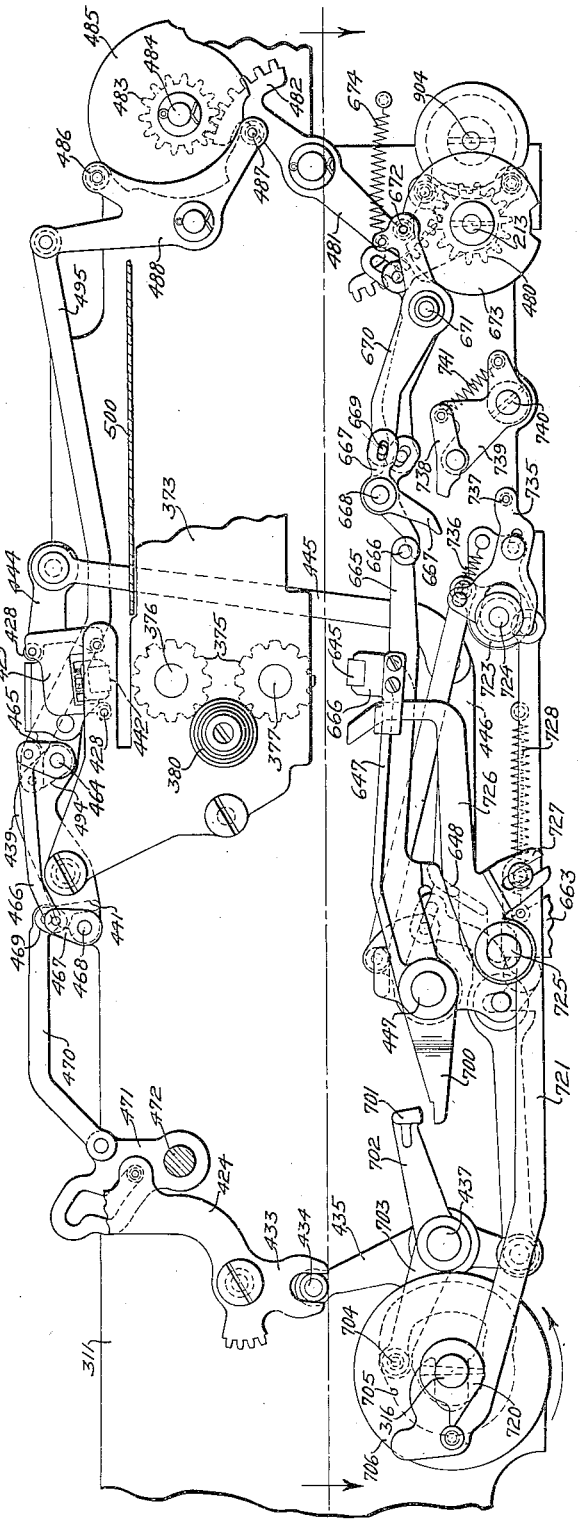
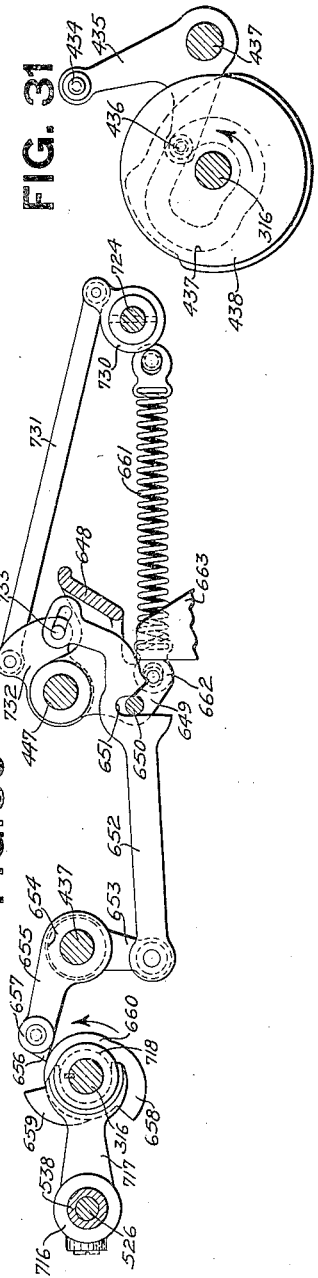
Inventor
Bernis M. Shipley
By Earl Beust
Henry E. Stauffer
His Attorneys Feb. 18, 1930.     B. M. SHIPLEY     1,747,397
CASH REGISTER
Filed Jan. 16, 1924     20 Sheets-Sheet 11
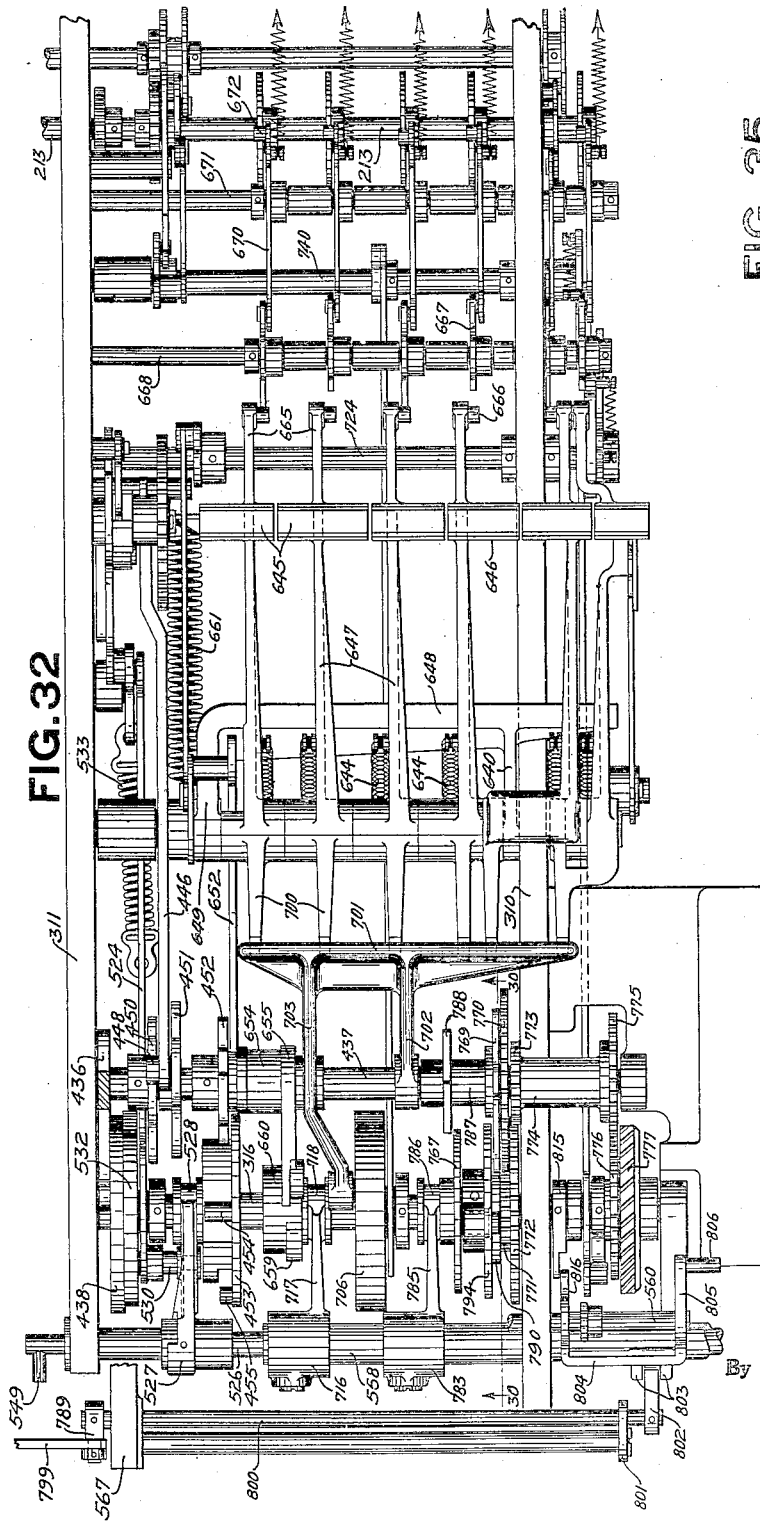
Inventor
Bernis M. Shipley
By Pearl Beust
Henry E. Stauffer
His Attorneys Feb. 18, 1930.  B. M. SHIPLEY  1,747,397
CASH REGISTER
Filed Jan. 16, 1924    20 Sheets-Sheet 12
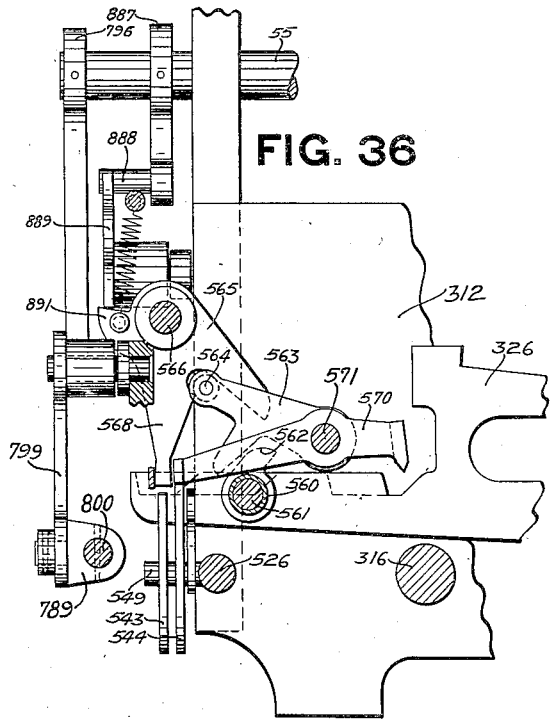
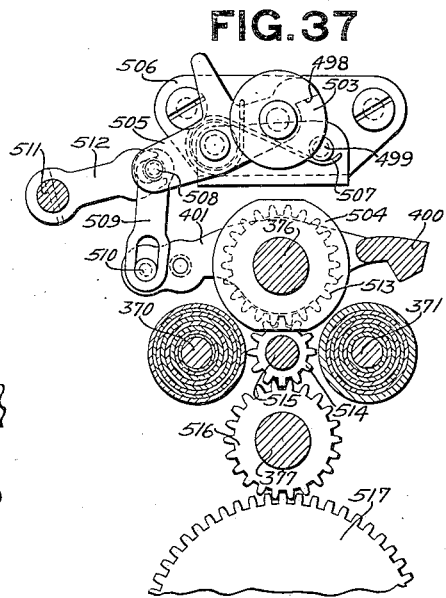
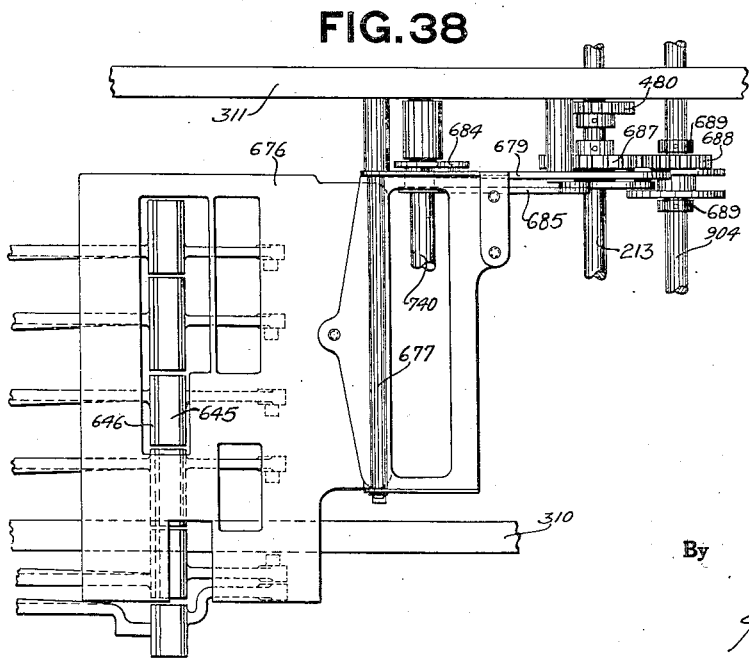
Inventor
Bernis M. Shipley
By
His Attorneys Feb. 18, 1930.   B. M. SHIPLEY   1,747,397
CASH REGISTER
Filed Jan. 16, 1924   20 Sheets-Sheet 13
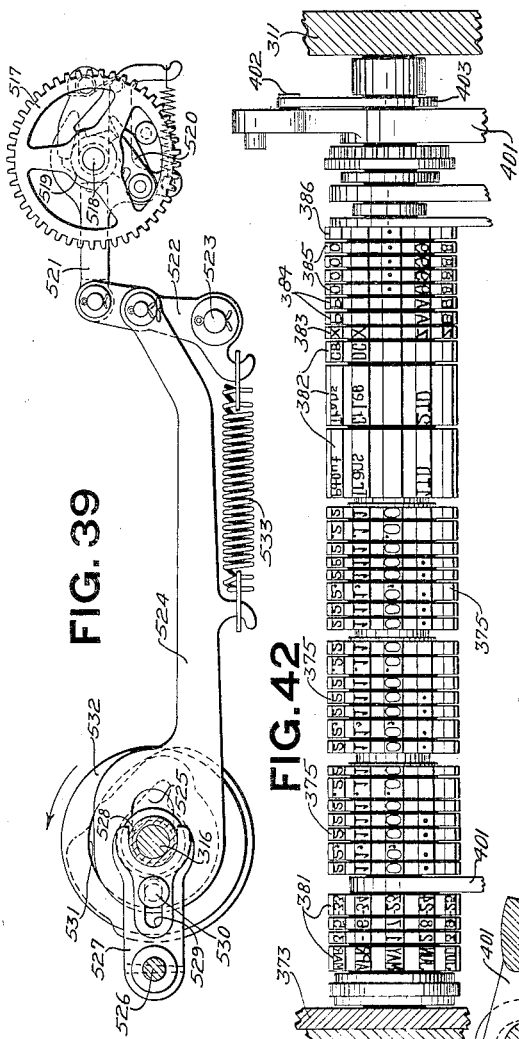
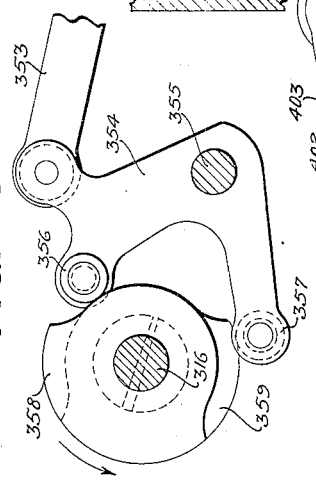
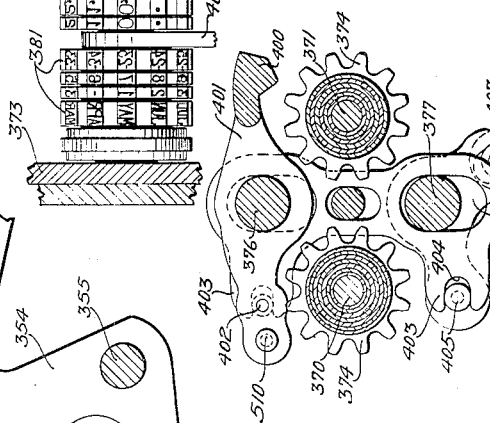
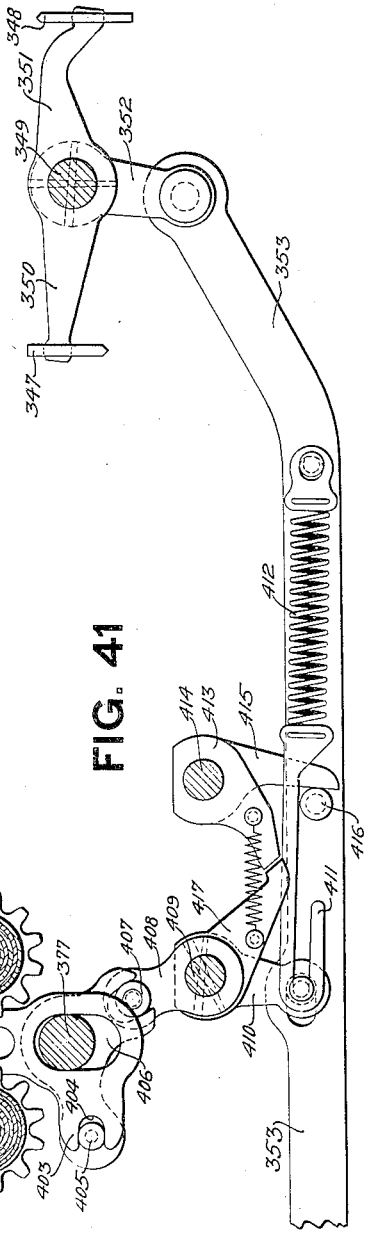
Inventor
Bernis M. Shipley
By Carl Beust
Harry E. Stauffer
His Attorneys Feb. 18, 1930.    B. M. SHIPLEY    1,747,397
CASH REGISTER
Filed Jan. 16, 1924    20 Sheets-Sheet 14
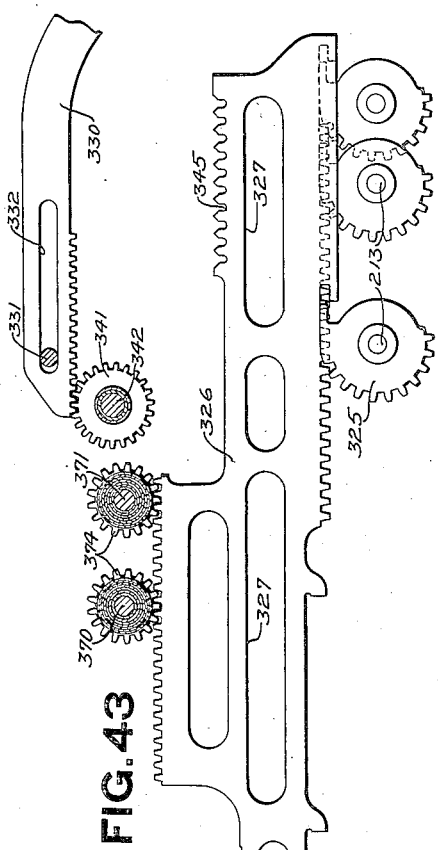
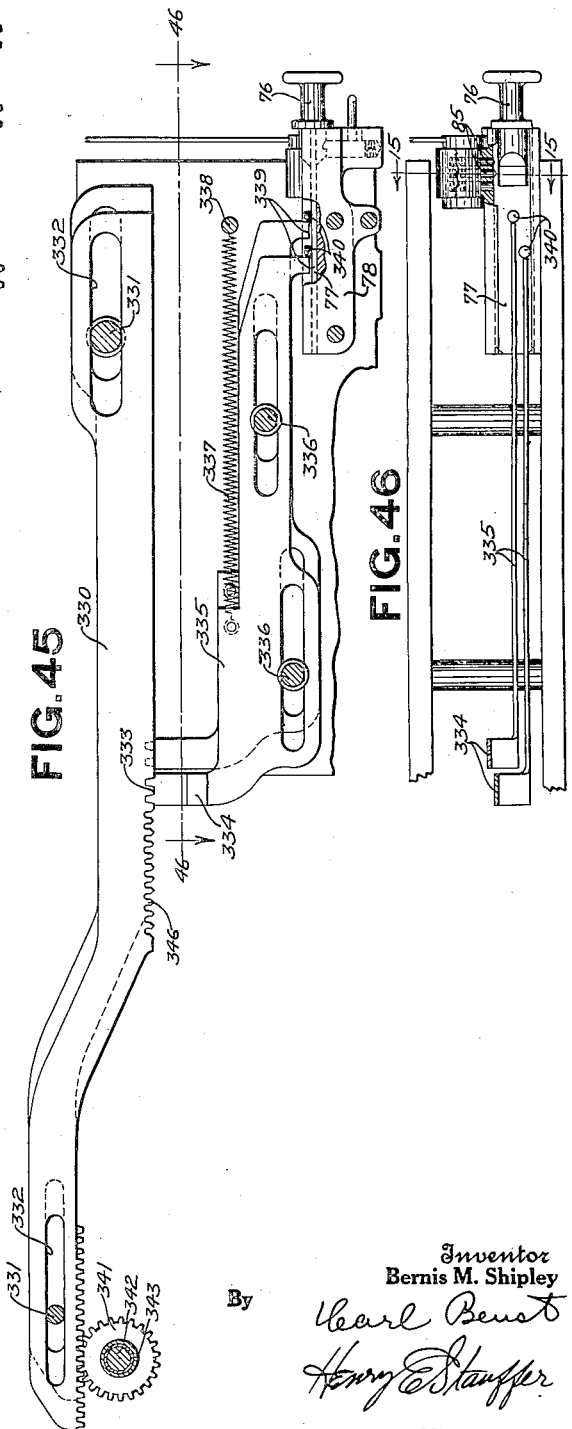
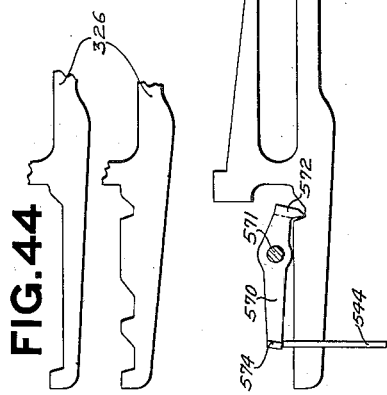

Feb. 18, 1930.   B. M. SHIPLEY   1,747,397
CASH REGISTER
Filed Jan. 16, 1924   20 Sheets-Sheet 15
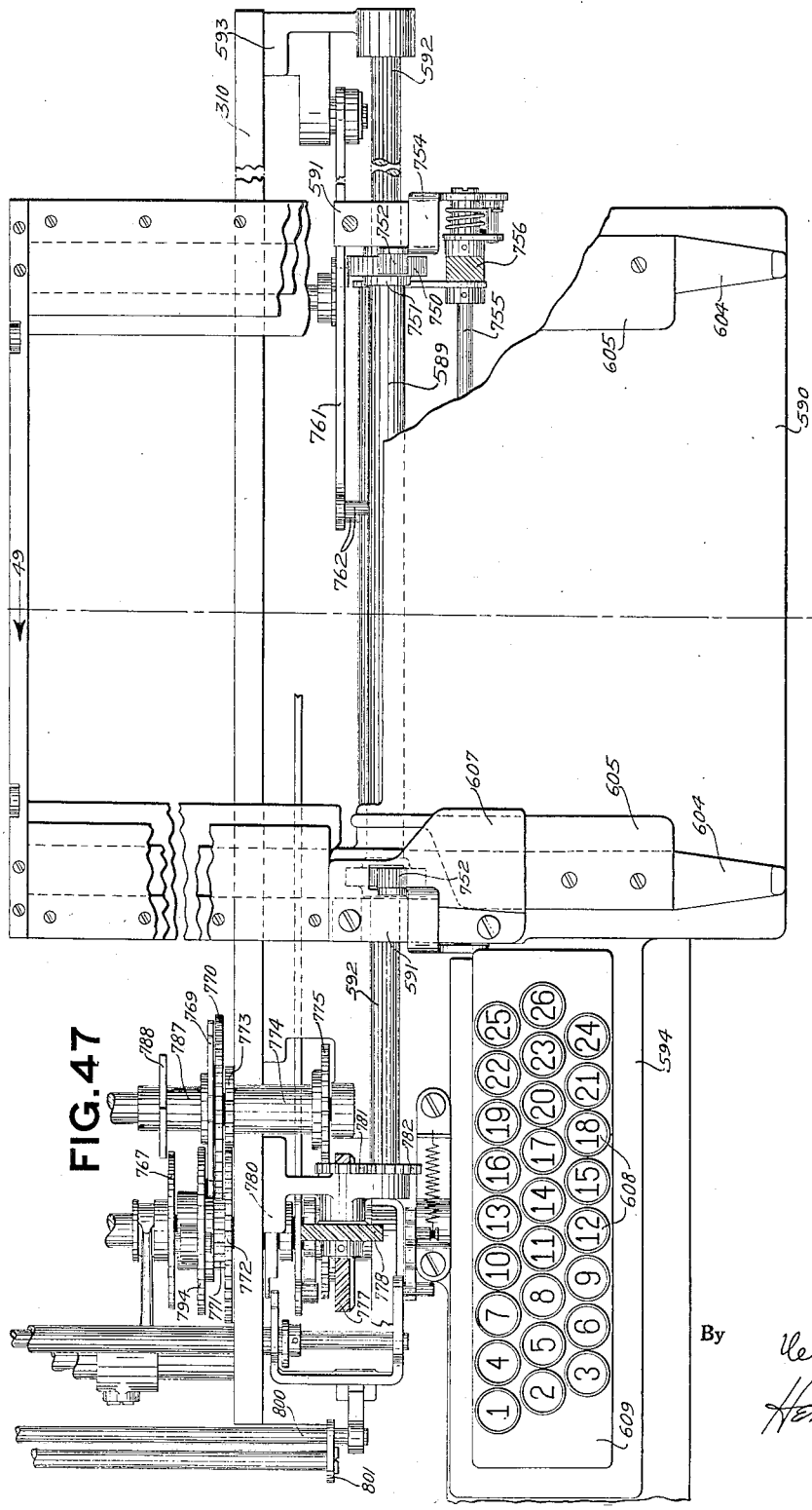
Inventor
Bernis M. Shipley
By Pearl Beust
Henry E. Stauffer
His Attorneys Feb. 18, 1930.                    B. M. SHIPLEY                    1,747,397
                                   CASH REGISTER
                              Filed Jan. 16, 1924            20 Sheets-Sheet 16
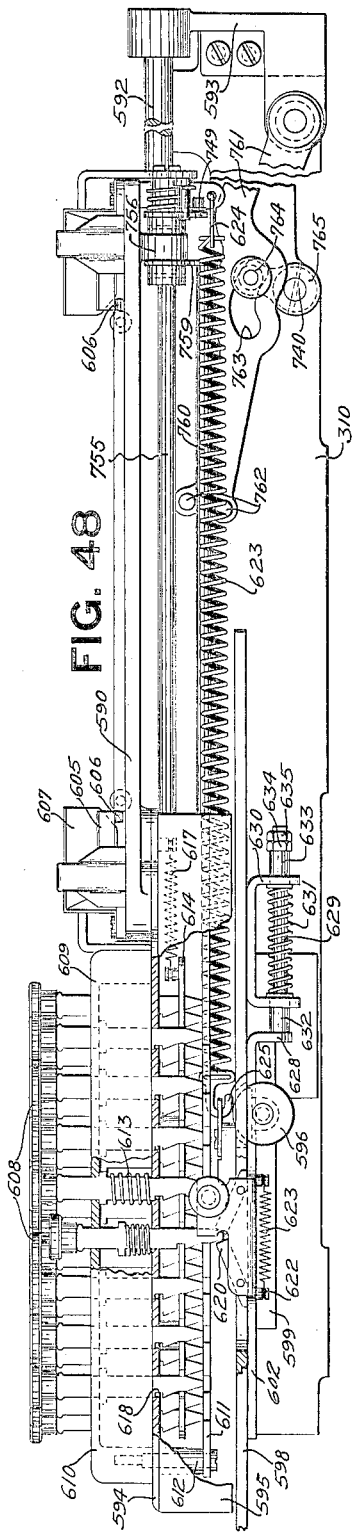
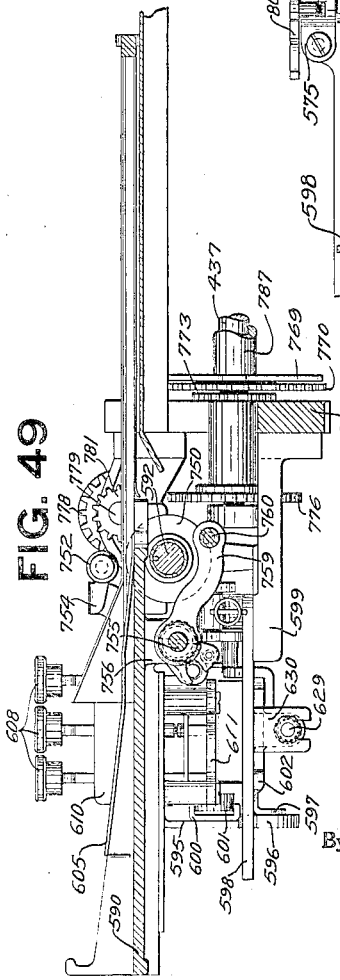
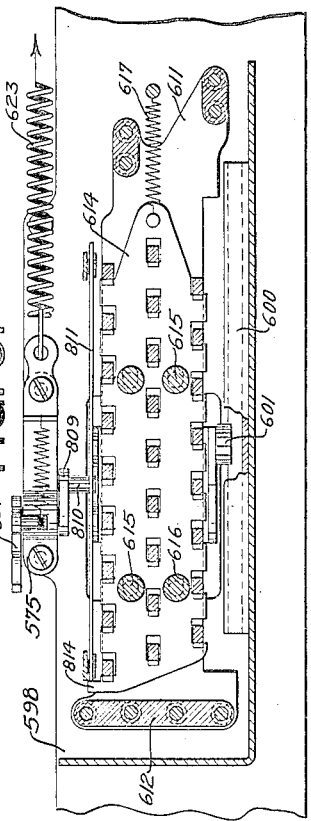
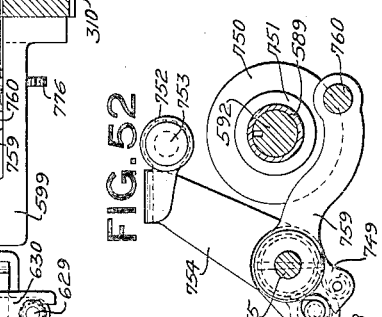
Inventor
Bernis M. Shipley
By Carl Beust
Henry E. Stauffer
His Attorneys Feb. 18, 1930.   B. M. SHIPLEY   1,747,397
CASH REGISTER
Filed Jan. 16, 1924   20 Sheets-Sheet 17

FIG. 53

```
···87.00                                    BF   A.....
              ·····4.60 Sundr's                  A.441A
···91.60                                   Z    A.....
              ·····1.75 Restrnt                  A1456.
····1.75                                   Z    A.....
···48.00                                   BF   A.....
              ·····2.50 Porter                   A1351.
···50.50                                   Z    A.....
····1.75                                   BF   A.....
              ·····3.50 Laundry                  A1456.
              ·····1.25       L-Dist             A1456.
              ·····2.00 Porter                   A1456.
····8.50                                   Z    A.....
···91.60                                   ✯    A.....
              ·····10.00      Rooms              A.441A
··101.00                                  ✯Z    A.....
···50.50                                   ✯    A.....
              ·····6.50       Rooms              A1351.
···57.00                                  ✯Z    A.....
····8.50                                   ✯    A.....
              ·····0.50       L-Phon             A1456.
              ·····6.50       Rooms              A1456.
···15.50                                   ✯    A.....
···57.00                                   OP-Bal A.....
              ·····1.75 TeLegrm                  A1351.
···58.75                                   Z    A.....
···15.50                                   OP-Bal A.....
              ·····1.50 Sundr's                  A1456.
              ·····1.50 Restrnt                  A1456.
              ·····6.00 Valet                    A1456.
···24.50                                   Z    A.....
···58.75                                   BF   A.....
         ···60.00                          CshCr A1351.
         ····0.01                          CB   A1351.
····1.25                                   CBZ  A.....
99,999.99                                  Z    A.....
···24.50                                   BF   A.....
              ·····2.50 Porter                   A1456.
              ·····6.50       Rooms              A1456.
···33.50                                   Z    A.....
···33.50                                   BF   A.....
         ···33.50                          CshCr A1456.
···0.00                                    Z    A.....
         ·74,968.50           Rooms        Z·A.....
         ···705.00 Porter                  X AA.....
```

FIG. 54

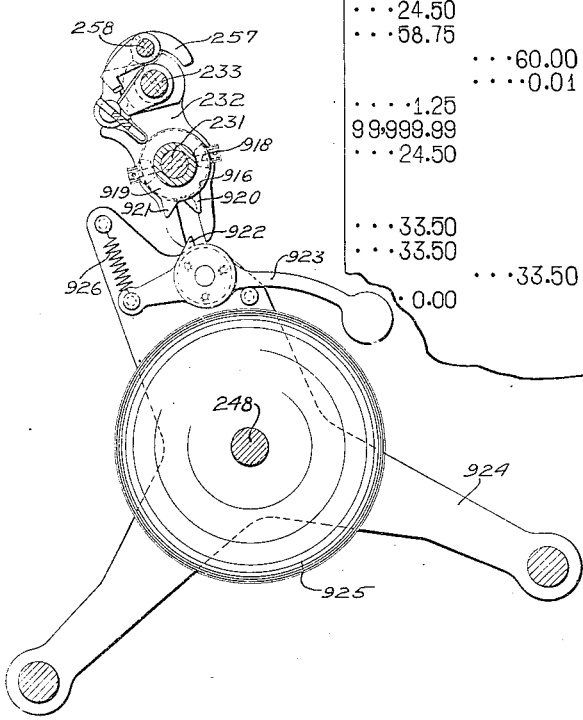

Inventor
Bernis M. Shipley
By Carl Beust
Henry E. Stouffer
His Attorneys

Feb. 18, 1930.    B. M. SHIPLEY    1,747,397
CASH REGISTER
Filed Jan. 16, 1924    20 Sheets-Sheet 18

FIG. 55

VALET CHARGE     N° 331

HOTEL DOE    Date *May 18 1923*

Name *Mr. James Roe*     Room A-1456

| ARTICLES | | | | Remarks: |
|---|---|---|---|---|
| 1-3 Pc Suit | Pressing | 1 | 50 | |
| 1-TopCoat | Cleaning | 4 | 00 | |
| | Repairing | | 50 | |
| | Total | 6 | 00 | |

MAY18-23      · · · · · 6.00 Valet      A1456

*Smith*

FIG. 56

| MEMO | DATE | BALANCE | CREDIT | CHARGE | DEPARTMENT | ROOM |
|---|---|---|---|---|---|---|
| 1 | MAY17-23 | · · · · 1.75 | | · · · · · 1.75 | Restrnt | A1456 |
| 2 | MAY17-23 | | | · · · · · 3.50 | Laundry | A1456 |
| 3 | MAY17-23 | | | · · · · · 1.25 | L-Dist | A1456 |
| 4 | MAY17-23 | · · · 8.50 | | · · · · · 2.00 | Porter | A1456 |
| 5 | MAY17-23 | | | · · · · · 0.50 | L-Phon | A1456 |
| 6 | MAY17-23 | · · · 15.50 | | · · · · · 6.50 | Rooms ★ | A1456 |
| 7 | MAY18-23 | | | · · · · · 1.50 | Sundr's OB | A1456 |
| 8 | MAY18-23 | | | · · · · · 1.50 | Restrnt | A1456 |
| 9 | MAY18-23 | · · · 24.50 | | · · · · · 6.00 | Valet | A1456 |
| 10 | MAY18-23 | | | · · · · · 2.50 | Porter | A1456 |
| 11 | MAY18-23 | · · 33.50 | | · · · · · 6.50 | Rooms | A1456 |
| 12 | MAY18-23 | · · · · 0.00 | · · · 33.50 | | CshCr | A1456 |
| 13 | | | | | | |
| 14 | | | | | | |
| 15 | | | | | | |
| 16 | | | | | | |
| 17 | | | | | | |
| 18 | | | | | | |
| 19 | | | | | | |
| 20 | | | | | | |
| 21 | | | | | | |
| 22 | | | | | | |
| 23 | | | | | | |
| 24 | | | | | | |

Please pay last balance shown 

Inventor
Bernis M. Shipley
By *Earl Beust*
*Henry E. Stauffer*
His Attorneys

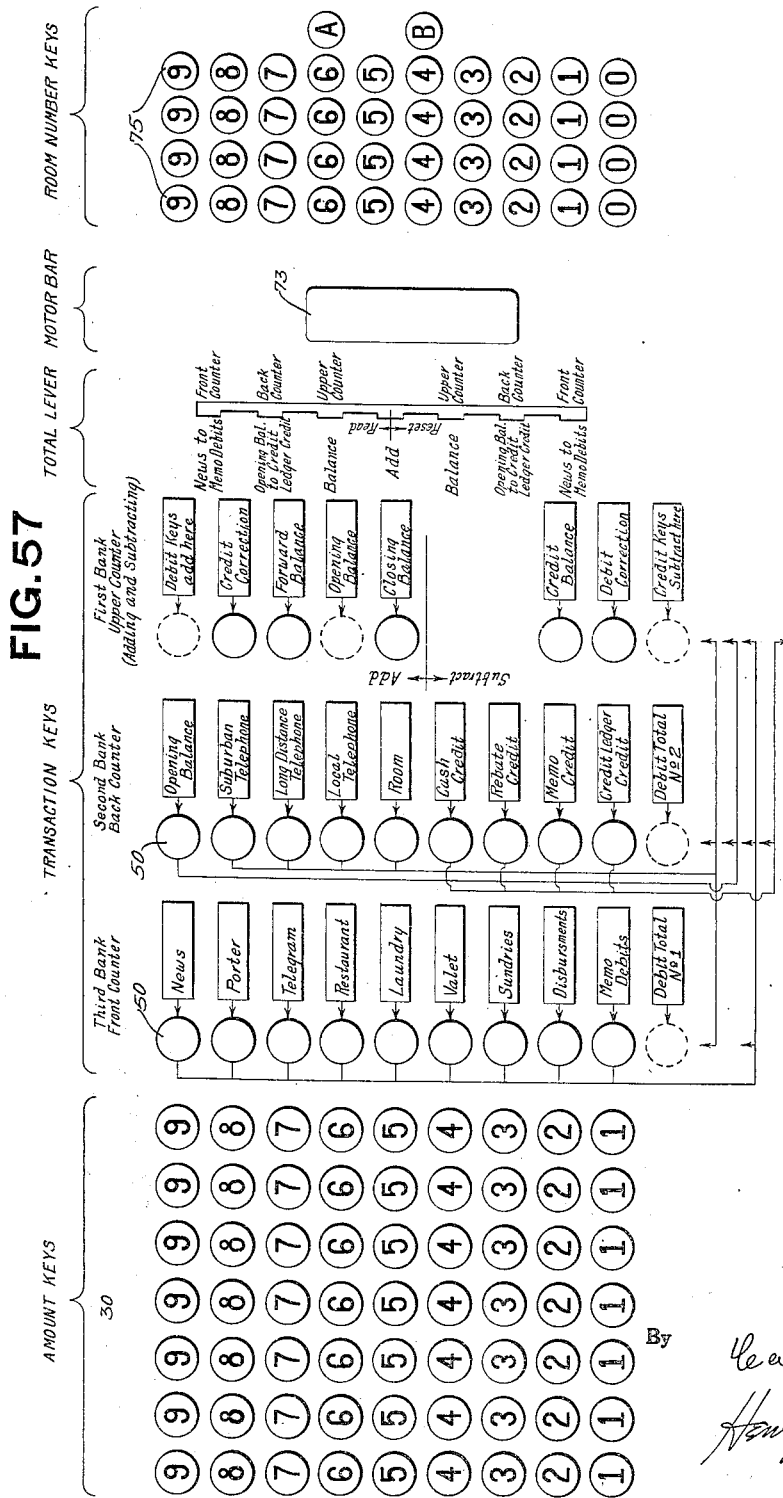

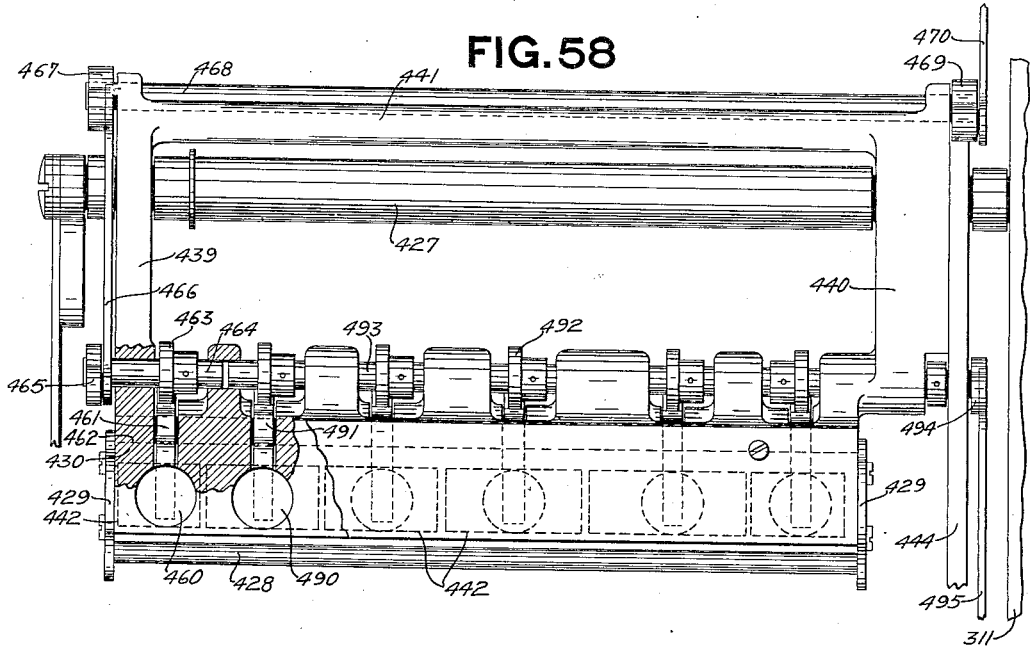

Patented Feb. 18, 1930

1,747,397

UNITED STATES PATENT OFFICE

BERNIS M. SHIPLEY, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed January 16, 1924. Serial No. 686,564.

This invention relates to cash registers and the like, and has more particular relation to the type of machine shown and described in Letters Patent of the United States, No. 1,230,864, issued to W. A. Chryst on June 26, 1917, and Nos. 1,242,170 and 1,394,256, issued to F. L. Fuller on October 9, 1917 and October 18, 1921, respectively; and No. 1,619,796, issued to applicant on March 1, 1927, and a copending application of the present applicant, No. 610,273, filed January 2, 1923, respectively.

One object of the present invention is to provide a machine for use in large hotels, clubs or similar institutions to keep the account of each guest separately, making the total amount owed by each guest instantly available, and also giving the total amount of business done in the various departments of the institution.

Another object is to provide novel mechanism for controlling certain ones of the zero stop pawls by key banks other than their own.

Still another object of this invention is to provide the machine with a novel "Cashier's" key which must be inserted before the machine can be operated.

Another object of this invention is to provide a novel card carriage, equipped with a line finding mechanism including manipulative devices, such as depressible keys.

A further object of the invention is to provide a plurality of impression hammers which are automatically selected under control of depressible keys or an adjustable lever, to print in various columns.

With these and incidental objects in view the invention consists of certain novel features of construction and combinations of parts, the essential elements of which are set forth in appended claims and a preferred form or embodiment of which is hereinafter described with reference to the drawings which accompany and form part of this specification.

Of said drawings:

Fig. 1 is a perspective view of the machine to which this invention is applied.

Fig. 2 is a section taken through the machine just to the right of one of the amount banks.

Fig. 3 is a detail side elevation of a portion of the mechanism associated with the third transaction bank for rocking out the zero stop pawl in the first transaction bank when any key in said third bank is depressed.

Fig. 4 is a detail side elevation of a part of the mechanism which breaks the latch in the first transaction bank in the sixth position when the "Opening Balance" key in the second transaction bank is depressed.

Figs. 5 and 6 taken together illustrate a part of the mechanism which rocks out the zero stop pawl in the first transaction bank upon the depression of any key in the third transaction bank.

Figure 7:
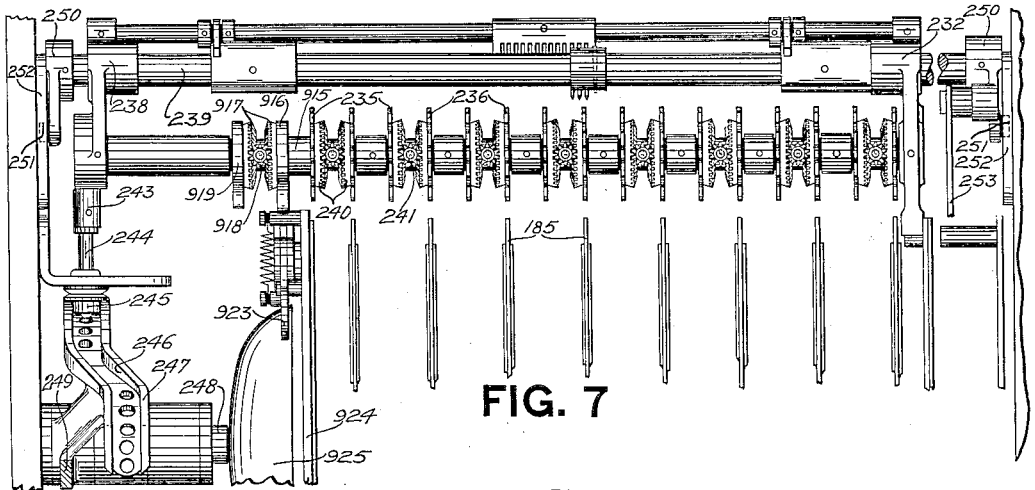

Fig. 7 is a front elevation of the adding and subtraction totalizer, called herein the "Balance" totalizer, together with the cam which positions the same for operation.

Figure 8:
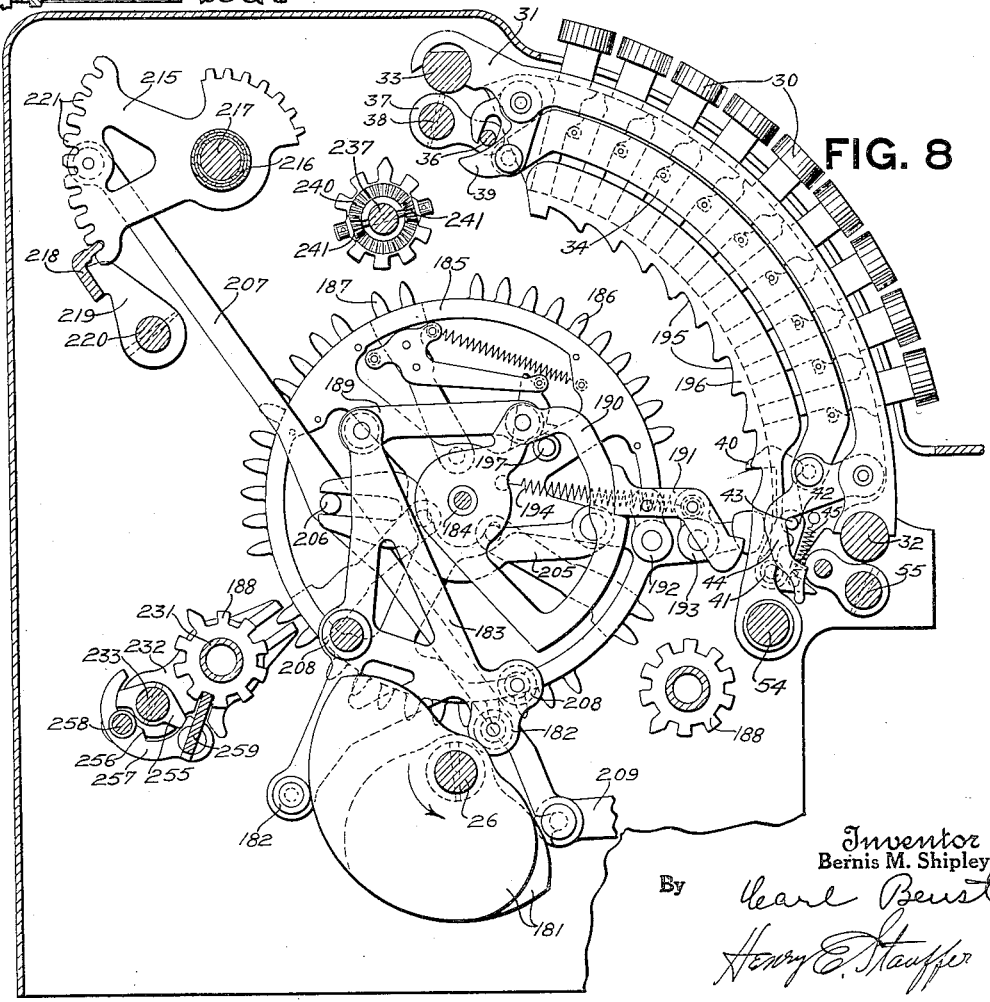

Fig. 8 is a sectional view taken through the machine just to the left of an amount bank.

Fig. 9 is a detail side elevation of a part of the releasing mechanism.

Fig. 10 is a detail sectional view taken through the releasing mechanism, and shows the part thereof controlled by the second and third transaction banks.

Fig. 11 is a sectional view through the machine taken just to the right of the second transaction bank.

Fig. 12 is a rear elevation of the releasing and interlocking mechanisms.

Fig. 13 is a section taken through the machine just to the right of the first transaction bank.

Fig. 14 is a right side elevation of the machine and shows particularly the manual key releasing mechanism.

Fig 15 is a section taken on line 15—15 of Fig. 46, looking in the direction of the arrows.

Fig. 16 is a detail side elevation of the mechanism for rocking out the zero stop pawl in the first transaction bank upon the depression of certain keys in the second transaction bank.

Fig. 17 is a detail top view of the interlocking mechanism between the transaction banks.

Fig. 18 illustrates the mechanism for driving the printer, and also that for limiting the printer to one operation during total-taking operations.

Fig. 19 is a detail side elevation of a portion of the mechanism shown in Fig. 18.

Fig. 20 is a detail side elevation of the total lever plate, and part of the mechanism associated therewith.

Fig. 21 is a left hand elevation of a portion of the printing mechanism, and shows the mechanism for releasing the card table at the end of a totalizing operation.

Fig. 22 is a detail view of the bar for releasing the line selector keys.

Fig. 23 is a detail sectional view showing the manual control of the slip and card mechanism.

Fig. 24 is an enlarged detail view of a part of the mechanism for releasing the card table at the end of a totalizing operation.

Fig. 25 shows a part of the automatic slip control.

Fig. 26 is a section through the printing mechanism immediately inside the front printer frame.

Fig. 27 is a detail side view of the driving mechanism for the upper impression means.

Fig. 28 shows the mechanism for positioning the card shield.

Fig. 29 shows both the upper and lower impression mechanisms, together with the driving and controlling means therefor.

Fig. 30 is a detail side elevation of the lower impression driving and disabling mechanism.

Fig. 31 is a detail view of the cam and arm for shifting the record strip, and for disabling the date platen of the upper impression mechanism.

Fig. 32 is a top plan view of the lower impression means, together with its driving, selecting, and controlling mechanisms.

Fig. 33 is an enlarged detail top view of the knobs for manually controlling the slip and card mechanisms.

Fig. 34 is a detail side elevation of a portion of the card ejecting mechanism.

Fig. 35 is a detail view of the mechanism for selecting the balance column on the record cards under control of the total lever.

Fig. 36 is an enlarged detail view of part of the automatic slip control mechanism.

Fig. 37 is an enlarged detail view of the slip ejecting mechanism.

Fig. 38 is a plan view of the card shield positioning mechanism.

Fig. 39 shows the slip ejector driving and disabling mechanism.

Figs. 40 and 41, taken together, show the type wheel and type wheel rack alining mechanisms, with the means for operating them.

Fig. 42 shows the upper group of type wheels.

Fig. 43 is a detail side elevation of one of the transaction racks, and also a portion of one of the room number racks.

Fig. 44 is a detail view of the left hand ends of the first and second transaction racks, with the notches for controlling the automatic slip mechanism.

Fig. 45 is a side elevation of the cashier's key and the mechanism for setting up the cashier's letter, or corresponding character on the type-wheel.

Fig. 46 is a sectional view taken on the line 46—46 of Fig. 45.

Fig. 47 is a top plan view of the card table, line selector, card ejector and table releasing means.

Fig. 48 is a front elevation, partly in section, of the card table and the line selecting mechanism therefor.

Fig. 49 is a detail sectional view taken on line 49—49 of Fig. 47.

Fig. 50 is a detail of the bars for stopping the card table on the line selected.

Fig. 51 is a horizontal section through the line selector keyboard, showing the detent which maintains and releases a depressed key in this keyboard.

Fig. 52 is a detail of the card tension and ejecting mechanism.

Fig. 53 is a facsimile of a fragment of the audit strip printed by the present machine.

Fig. 54 is a detail side elevation of the overdraft bell ringing device.

Fig. 55 is a facsimile of a slip such as is printed and ejected by the present machine.

Fig. 56 is a facsimile of the card upon which the account of each guest is kept when the machine is used in the hotel business or the account of a depositor when the machine is used in a bank.

Fig. 57 is a diagrammatic view of the keyboard as used in the present machine.

Fig. 58 is a detail top view, partly in section, of the upper platen-carrying frame.

Fig. 59 is a detail view of the zero stop pawl for the "Balance" bank and the mechanism cooperating therewith.

General description

It is believed that in a machine of this type, which is devoted to a particular line of business, the understanding thereof will be facilitated by a description of the business system with which it is adapted to be employed. In the present instance the machine is especially adapted for use in large hotels, or similar institutions.

In a large hotel it is necessary to keep a separate account for each guest, and this of course involves an immense amount of bookkeeping. It is necessary to be able to give any guest his debit or credit balance at any time he may desire it, and close his account when he leaves.

The present machine is constructed to take care of all transactions between the hotel and a guest. When a guest arrives, and is assigned to a room, two cards are made out for him, one like the facsimile shown in Fig. 56, and the other bearing the same ruling and printed matter, but slightly larger than the first, for a purpose which will be later described. At the top of these cards the guest's name and room number are typewritten, and they are placed in their proper places in any convenient form of filing device.

When, for instance, the guest patronizes the dining room and signs the check for his meal, this check is sent to the cashier's office. The cashier in charge removes the guest's cards from the file and places them in the machine. The dining room check is also placed in the machine. As this is the first charge, there is no balance, so the amount of the charge is set up on the amount keys and the "Restaurant" key depressed (Fig. 57). Then the motor bar is depressed and the machine operated, and the amount of the charge is entered in three totalizers; first, in the one appropriate to the "Restaurant" key, which keeps a total of all restaurant items; second, on the total debit totalizer for this bank, which records all charge items; and, third, in the "Balance" totalizer, which computes the debit or credit balance of the guest after each entry.

The amount of the charge is printed in the charge column of each card, upon the restaurant check, and on an audit strip which is retained in the machine. The larger of the two cards is printed first and then ejected, as will be later described, so that the second impression can be made on the remaining card.

The total lever is then moved to the reset "Balance" position, and the machine again operated. This operation will print this first charge, which is now the debit balance, in the "Balance" column of each card and on the audit strip.

Assuming that the next charge is for laundry, when the charge slip reaches the cashier she again removes this guest's cards from the file. Before they are inserted in the machine, however, the amount of the previous balance is set up on the amount keys and the "Forward Balance" key is depressed. Then the machine is operated in order to set up the previous balance on the "Balance" totalizer.

The amount of the charge for laundry is then set up on the amount keys and the "Laundry" key depressed, the cards and charge slip having previously been inserted in their proper places in the machine. This operation enters the charge in the "Balance" totalizer, the "Laundry" totalizer, and the appropriate total debit totalizer, as well as printing the amount in the charge column of each card and on the audit strip.

The total lever is then moved as before, to the reset balance position and the machine operated, which will compute the new balance and record it in the balance column of each card and on the audit strip.

In this manner, all charges against a guest are entered on his record cards and a new balance taken. When he is ready to check out, and asks the cashier for his bill, she simply has to remove his card from the file and tell him the last balance recorded thereon. When she receives the cash she inserts both cards in the machine and sets up the last balance, depresses the "Forward Balance" key and operates the register. She then sets up the balance again and depresses the "Cash Credit" key. Then when the machine is operated, the amount paid is printed in the "Credit" column of each card and audit strip. The depression of the "Cash Credit" key causes the amount paid to be subtracted from the "Balance" totalizer, leaving this totalizer at zero. Then the total lever is moved to its "Balance" position and the machine operated, which prints zeros in the balance column of each card, and also on the audit sheet, showing that the account has been paid.

If the guest is staying on, and pays the cashier more money than he owes, allowing the balance to stand to his credit, the operation is the same, with one exception. The balance owed is entered first on the adding side of the "Balance" totalizer. Then the amount paid is entered with the "Cash Credit" key depressed. This causes the amount paid to be substracted from the amount owed, and as the former is the larger amount the totalizer wheels pass over zero and register the credit balance. However, the amount now on the subtracting side of the totalizer is one cent short, due to the fact that the normal position of these wheels is at 9 instead of 0. It is therefore necessary for the operator to depress the one-cent key and add this amount to the amount on the subtracting wheels so that the correct credit balance will be printed.

The credit balance is then printed by pressing the "Credit Balance" key and moving the total lever to the "Balance Reset" position. The subtracting wheels are thereby returned to zero and the credit balance printed in the credit column of each card and on the audit strip in a manner well known in the art.

When a credit balance is taken, however, and the subtracting wheels are returned to zero, the adding wheels of the balance totalizer are left at 9. Before the machnie can again be operated it is necessary to clear the adding side of the balance totalizer in order to return these wheels to zero. This is accomplished by moving the total lever to the "Balance Reset" position and operating the machine. The amount of $99,999.99 will then be printed on the audit strip, but not on the cards, as they have been removed before this operation takes place.

At midnight the night auditor assumes charge of the machine. When the cashier leaves, she locks all the balance keys except that labeled "Closing Balance", to which the auditor is to have access. He then goes through the guests' accounts, room by room, and adds thereto the prices of their rooms, always taking the new balance for each account so that they will be ready to settle at any time. When the prices of the rooms are added to the accounts, the "Closing Balance" key is depressed. This key is adapted to print a star opposite the amount so that it can be easily seen whether or not this charge has been properly made. The new balance is taken in the regular way, as has been described. The account of each guest is thus closed every night by the night auditor.

On the following morning it is necessary for the cashier to reopen any account to which a charge is added. In order to do this she sets up the closing balance on the amount keys and depresses the "Opening Balance" key. The amount of the closing balance is thus set up on the "Balance" totalizer and printed on the audit strip, together with the letters "OB" to indicate its character. The cards are not inserted in this operation, as it is not desired to print the balance twice on the cards. The cards may be now inserted and any new charge entered in the regular way. The new balance is taken and the cards are then returned to the file.

Operating means

The present machine may be operated either by an electric motor or a crank, as desired. Any suitable type of motor may be used, and none is therefore shown herein. If for any reason the electric motor is not used, the machine may be operated with a crank handle 25, shown in Fig. 14. This crank handle is connected through a means (not shown) with a main drive shaft 26 (Figs. 2, 8, 11 and 13), which is given one complete rotation on every operation of the machine. It requires two complete rotations of the crank handle to give the main drive shaft 26 its single rotation. If an electric motor is used to drive the machine it is also connected to the main drive shaft 26 by means well known in the art, and shown in the prior patents and application mentioned above, and will through said connections rotate the shaft 26.

KEYBOARD

Amount keys

There are seven banks of amount keys 30 in the present machine (Figs. 1, 2 and 8). These banks are identically the same as the amount banks shown and described in the above mentioned patents and application, and, therefore, but a very brief description thereof will be given herein. The keys 30 are mounted in key frames 31 supported at their lower ends upon a rod 32 and at their upper ends upon a rod 33. Each of these keys cooperates with a detent 34 and a locking plate (not shown) supported by a link 52, and each key is held in its normal outer position by a spring 35 contacting a pin carried by the shank of the key. Each of these keys has a shoulder which, when the key is depressed, contacts a corresponding pin on the detent 34, thereby moving said detent downwardly until the shoulder on the key has passed the pin on the detent, whereupon the detent will move upwardly far enough to prevent the key from returning to its normal outer position. The keys are released near the end of the operation of the machine by a rod 36 carried by a plurality of arms 37 fast on a shaft 38. The rod 36 cooperates with a tail 39 of the detent supporting link, and the link supporting the locking plate, and when the shaft 38 is rocked clockwise (Fig. 8), by means well known in the art, near the end of the operation, the detent and locking plate will be moved downwardly far enough to permit the shoulders on the keys to pass the pins carried by the detent, and the keys are then returned to their normal positions by their springs 35.

Cooperating with each bank of amount keys is a zero stop pawl 40 (Figs. 2 and 8), the function of which will be described later. These pawls are fast on shafts 41 mounted in the key frames 31. These shafts also carry arms 42 which, in turn, support pins 43 normally contacting the links 44 pivoted to the key frames and also pivotally connected to the lower ends of the detents 34 for supporting the same. The zero stop pawls are normally in the position shown in Fig. 8, but when a key in its corresponding bank is depressed, the lowering of the detent 34 rocks the link 44 counter-clockwise (Fig. 8), which through pin 43, arm 42, and shaft 41, rocks the zero stop pawl 40 clockwise to its ineffective position. Each zero stop pawl is normally maintained in its effective position by a spring 45 (Fig. 8) extending between a pin on a projection of the arm 42 and a pin on the key frame 31.

Transaction keys

In the present description, the banks of transaction keys will be referred to as the first, second and third banks counting towards the left from the total lever. Fig. 11 shows the second transaction bank. This bank and the third transaction bank are practically the same structurally and, therefore, only the second bank is illustrated. Each of these banks has a plurality of keys 50 mounted in key banks 31 similar to the key banks for the amount keys, and are supported on the rods 32 and 33 above mentioned. Each of the transaction keys carries a pin which cooperates with an inclined surface on a detent 51 in a manner well known in the art. When any one of the transaction keys is depressed, the detent 51 will be moved downwardly until the pin on the depressed key has passed the inclined surface, whereupon the detent will move up to its normal position and retain the key in its depressed position. The transaction keys are released near the end of an operation of the machine by the mechanism which releases the amount keys. It is not thought necessary to specifically describe this mechanism herein.

Mechanism is provided which, when any transaction key is depressed, prevents the depression of another key in any of the other transaction banks. Slidably mounted on a shaft 55 are two sleeves 56 and 57 (Figs. 11, 13 and 17). These sleeves are shaped so as to conform to the rod 32 above mentioned to prevent said sleeves from turning on the shaft 55. Also loose on said shaft 55 are two sleeves 58 and 59. Fast on said shaft to the left of sleeve 58 is an arm 879, the function of which will be later described. This arm prevents any lateral movement of the sleeve 58 toward the left (Fig. 17). Also fast on the shaft 55 is an arm 61 which lies immediately adjacent the sleeve 59 and thereby prevents lateral movement of the sleeve 59 toward the right. All of the sleeves 56, 57, 58 and 59 carry flanges which have their corners beveled, as seen in Fig. 17. These beveled edges cooperate to form V-shaped notches. Pivoted to the key bank 31 for each of these transaction banks is an arm 62 (Figs. 11 and 13), to which is pivoted the lower end of a controlling bar 140. It can be seen that when the bar 140 is lowered, due to the depression of a key in its particular bank, the arm 62 will be rocked clockwise (Fig. 11). The links 62 are similar to the links 44 of the amount banks and each cooperates with a pin on a zero stop pawl 64 for its own bank. Each link 62 has a beveled edge which normally lies opposite the V-shaped notch formed by the beveled edges of the flanges on sleeves 56, 57, 58 and 59. Therefore, when the link 62 is rocked clockwise, as above described, the beveled edge thereof will wedge between the flanges on the sleeves 58 and 56, 56 and 57, or 57 and 59, and force the sleeves 56 and 57 one way or the other upon the shaft 55, depending upon in which bank a key was depressed. It can be seen from Fig. 17 that there is room for only one of the links 62 to enter between the sleeves 56 and 57, as the movement of the parts is limited by arms 879 and 61, which are fast to the shaft. Therefore, if an attempt is made to depress a key in one transaction bank when a key in another of the transaction banks has already been depressed, the link 62 will not be able to wedge its way between the sleeves and it will, therefore, be impossible to depress this key. But when this link 62 is rocked clockwise, as above described, it is evident that the stop pawl 64 will be rocked counter-clockwise to its ineffective position.

*First transaction or balance bank*

The first transaction bank, which will hereinafter be known as the "Balance" bank, is shown in Fig. 13. In general, its construction is the same as the second and third transaction banks shown in Fig. 11, with the exception that certain of the keys are omitted in this bank. The reason for omitting certain of these keys, and the general operation of this bank will be more fully described in connection with the differential mechanism therefor.

*Total lever*

Like all machines of this type, the present machine is provided with a total lever 70 (Fig. 20) integral with a total lever plate 71 adapted to control the various totalizer lines on totalizing operations, as well as other functions which need not be considered in detail at present. It is thought to be sufficient here to say that the total lever plate selects the totalizer line to be rocked into engagement with the actuators on totalizing operations.

*Motor bar*

Machines of the type herein illustrated are usually electrically operated, and in order to facilitate the rapid operation of the machine a large motor bar or key 73 is provided which can be easily struck in order to release the machine. The manner in which this release of the machine by the motor bar is accomplished will be hereinafter described.

*Room number keys*

To the right of the motor bar 73 are a plurality of banks of keys 75 adapted to control printing wheels for the purpose of printing the room number of the guest whose account card is in the machine. There are four of these banks of keys, giving a total registering capacity of 9,999 rooms, together with an A and a B key, which triples the capacity, if desired, or which can be used to designate certain classes of rooms.

*Cashier's key*

This machine is adapted to be used by a plurality of cashiers. Each cashier is provided with a key which must be inserted in the machine before the same can be operated. Each key is adapted to automatically set up the appropriate cashier's letter on the typewheels in a manner that will be hereinafter described. The key has a knob 76 (Fig. 1) by means of which it can be easily inserted and withdrawn. The key shank or stem 77 (Figs. 14, 15, 45 and 46) is adapted to be inserted into two grooves forming a keyway in a bracket 78 which is secured to the frame of the machine.

When the machine is released, the release shaft 38 is rocked in a clockwise direction (Fig. 14). Fast on the extreme right hand end of the shaft 38 is a lever 79 to which is pivoted a link 80 having at its lower end a slot 81 through which projects a pin 82 carried by an arm 83 fast on a short shaft 84 supported by the bracket 78. As can be seen in Fig. 15, the shaft 84 carries three spring-pressed tumblers 85 which, when there is no cashier's key in the machine, are pushed toward the left by their springs until they project beyond the periphery of the shaft 84 into holes in the bracket 78. It can be seen that when this condition exists the shaft 84 cannot be rotated. Therefore, as this shaft is connected with the release shaft 38 by the arm 83, pin 82, link 80 and lever 79, it is impossible to rock the release shaft 38 to release the machine. When, however, a cashier's key is inserted in its slot in the bracket 78, the right hand edge of the stem 77 thereof will contact plungers 86, one for each of the tumblers 85, and will push these plungers toward the right. These plungers engage the left hand ends of the tumblers 85 and the parts are so proportioned that the plungers 86 will move the tumblers 85 toward the right against the tension of their springs a sufficient distance to bring the ends of said tumblers 85 in line with the periphery of the shaft 84. It is evident, therefore, that when the cashier's key is inserted and the tumblers 85 moved into such positions, the shaft 84 can then be rocked through the lever 79, link 80, pin 82 and arm 83 which permits the shaft 38 to rock to release the machine.

Manual key release

A mechanism is provided for rocking the release shaft 38 in a counter-clockwise direction (Fig. 14) in case the operator depresses the wrong keys in entering a transaction, and wishes to return all the keys to their normal positions. Attached to the lever 79 is a link 88 which carries a roller 89. Pivoted to the side frame of the machine is a lever 90 which has a nose 91 adapted to cooperate with the roller 89. The lever 90 is also provided with a handle 92, and when it is desired to release the keys the lever 90 is rocked counter-clockwise. Upon this movement of the lever 90 the nose 91 contacts the roller 89 on link 88 and raises this link, which movement, through the lever 79, rocks the release shaft 38 in a counter-clockwise direction and releases the depressed keys in a manner which has been previously described. When the machine has been released, the release shaft 38 has been moved in a clockwise direction. This will lower the link 68 sufficiently to position a lug 94 carried thereby in front of a toe 95 of the lever 90 so that the lever 90 can be rocked in a counter-clockwise direction to release the depressed keys.

When the shaft 38 is rocked counter-clockwise by the key release lever 90 to release the depressed keys, the link 80 is moved downward. If the cashier's key should happen to be out of the machine, the shaft 84 would be locked against movement. Therefore a flexible connection must be provided between the link 80 and arm 83. The lower end of the link 80 has the long slot 81 formed therein through which the pin 82 extends at its lower end. A member 100 lies in the slot 81 with its lower end abutting against the pin 82. The member is held in position in the slot by two plates 101 riveted to its sides and extending over the sides of slot 81. At its upper end the member 100 has a pin 102 which extends upwardly in the slot 81 and carries a coil spring 103. At its upper end, the spring is seated on a pin 104, which projects downwardly from the link in the upper end of slot 81. It can be seen from the above description that when the link 80 is lowered with the cashier's key out of the machine, the spring 103 will be compressed sufficiently to compensate for said downward movement and the arm 83 and shaft 84 will not be strained.

The link 88 has a slot 96 cut therein through which projects a key barrel 97. If it is desired to lock the machine against operation, the lever 90 is rocked so as to raise the link 88. A key is then inserted in the key barrel 97 and given a one-half rotation. A portion of the key barrel 97 which cooperates with the slot 96 is eccentric, so that upon the rotation of the key and the barrel the link 88 will be rocked slightly counter-clockwise about its pivot, and then, when the handle 92 is released and the link 88 is permitted to move down, a notch 87 on the extreme lower end of the link 88 will rest upon a lug 98 which projects from the side frame. It can be seen that so long as the link 88 rests upon the lug 98 it will be impossible to lower this link to permit the rocking of the release shaft 38, and, therefore, the machine cannot be released or operated.

Release mechanism

In all machines of this type there is a release shaft, such as the shaft 38 above mentioned, which is adapted to be rocked in a clockwise direction (Figs. 9 and 10) by means of a powerful spring 111 (Fig. 12). This spring and its cooperating mechanism are only partially shown in this application, as they are well known in these machines. In the normal positions of the parts the release shaft is prevented from being rocked under the influence of the spring 111 by the engagement of a half-round stud 112, carried by an arm 113 pinned to the shaft 38, with a pair of pawls 114 and 115 loose on a shaft 116 (Figs. 9, 10 and 12). It can be seen from Fig. 9 that so long as either one of the pawls 114 and 115 remains in the path of movement of the flat face of the half-round stud 112, the shaft 38 cannot be rocked clockwise by the spring 111 to release the machine. When the machine is released, as will be hereinafter described, the releasing movement of the shaft 38 is limited by the engagement of an arm 117 (Fig. 12) with a pin 118 carried by the machine side frame.

When the proper keys in the keyboard have been depressed, the machine is adapted to be released by the motor bar 73, the shank of which has a bifurcated end 120 adapted to surround a pair of studs 121 carried by a slide 122, which in turn is mounted on a pair of studs 123 and 124 supported by the side frame. The slide 122 also carries a pin 125 which cooperates with the bifurcated end of a lever 126 pivoted on a stud 127 in the right hand side frame of the machine. At its opposite end, the lever 126 carries a pin 128 which projects through the bifurcated end of an arm 129 loose on the shaft 116. The arm 129 is made integral with a hook 130 by means of a yoke 131. When the motor bar 73 is pressed in, the hook 130 will be rocked clockwise about the shaft 116 (see Fig. 9).

A pin 132 carried by an arm 133 is adapted to cooperate with the inner periphery of the hook 130 and the arm 133 will thereby be rocked clockwise upon the clockwise movement of said hook. Connected to the arm 133, by a yoke 135, is a bifurcated arm 134 surrounding a pin 136 carried by the pawl 115, which pawl is the right hand one of the two pawls 114 and 115 which normally obstruct the movement of the flattened stud 112 to prevent the release of the machine. The pawl 114 is under the control of the keys in the transaction banks, and will have been rocked away from the stud 112 upon the depression of said keys in a manner which will be hereinafter described. Therefore, when the arm 133, yoke 135 and arm 134 are rocked clockwise (Fig. 9) the pawl 115 will be rocked counter-clockwise about the shaft 116 and will be moved away from the stud 112. As soon as both of the pawls 114 and 115 are raised out of the path of the stud 112, this stud, together with the arm 113 and shaft 38, will be rocked clockwise under the influence of the spring 111 far enough to permit operation of the cash register. The stud 112 will then be positioned between the pawls 114 and 115 and another pawl 137 loose on the shaft 116 and connected to the pawl 115 by a spring 138.

The means whereby the pawl 114 is rocked away from the stud 112 is shown in Figs. 10, 11, 12 and 13. Each of the transaction banks is provided with a controlling bar 140 which at its upper end is pivoted to an arm 141 carrying a pin 142 normally in contact with an upwardly extending arm 143 loosely mounted on the shaft 116. There is one of these arms 143 for each of the transaction banks and they are connected together by means of a yoke 145. The center one of the arms 143 is bifurcated and cooperates with the yoke 145, as shown in Fig. 10. Also connected to this yoke is a hook 146 (Fig. 10) which normally cooperates with an arm 147 pinned to the release shaft 38. This arm 147 has a projection which lies just beneath the hook 146, and thereby prevents a release of the machine so long as this hook remains in its normal position. When, however, any key of the three transaction banks is depressed, the yoke 145 will be rocked counter-clockwise, due to the engagement of the pin 142 with the arm 143, and as the hook 146 is operatively connected to the yoke 145 this hook will also be rocked far enough in a counter-clockwise direction to remove it from the path of the projection of the arm 147 and the shaft 38 is, therefore, free to rotate to release the machine so far as the hook 146 is concerned.

The yoke 145 has a rigid arm 152 carrying a pin 151 (Fig. 10) which cooperates with a bifurcated arm 150 loose on the shaft 116 and connected with the pawl 114 by a yoke 153. It can be seen from the above that whenever the yoke 145 is rocked as above described, due to the depression of one of the transaction keys, the yoke 153 will be rocked to a corresponding extent due to the slot and pin connection therebetween, and this movement of the yoke 153 will move the pawl 114 away from the flat side of the stud 112 to permit the release of the machine when the motor bar is depressed.

On totalizing operations it is sometimes desired to operate the machine without depressing any transaction keys, and for this reason mechanism is provided, under the control of the total lever plate 71, to rock out the pawl 114 and the hook 146 whenever the total lever 70 is moved from its normal adding position. A slot 155 is cut near the top of the total lever plate 71 (Fig. 20), and into this slot projects a pin 156 carried by an arm 157 fast on a shaft 158. Also fast on this shaft is an arm 159, the end of which carries a pin 160 which normally lies beneath an arm 161 loose on the shaft 116. The arm 161 also carries a pin 162 adapted to engage the hook 146. When the total lever 70 is moved out of its adding position, the arm 157, shaft 158 and arm 159 will be rocked slightly clockwise. Due to the engagement of the pin 160 with the arm 161 this arm and its pin 162 will be rocked counter-clockwise about the shaft 116 and the pin 162 will rock the hook 146 counter-clockwise out of the path of the projection on the arm 147 and the pawl 114 out of the path of the stud 112, as previously described.

Transaction bank interlocks

Mechanism is also provided to prevent the depression of any transaction key after the machine has been released, as well as mechanism to enforce the complete depression of a transaction key in order to release the machine. It will be remembered that upon the depression of any transaction key, the detent 51 will be lowered. At its upper end this detent is pivoted to an arm 163 (Fig. 13). This arm has a projection carrying a pin 164 which cooperates with a bifurcated portion of an arm 165 loose on the shaft 116. When the detent 51 is lowered, the arm 163 will be rocked clockwise about its pivot, and due to the engagement between the pin 164 and the arm 165 this arm will be rocked in a counter-clockwise direction. Fast on the shaft 38 is an arm 167 which, when the machine is released, will be moved into the path of a projection 166 of the arm 165 and which will thereby prevent the movement of the detent, and, of course, any depression of the keys, so that until the machine returns to its normal position no transaction keys can be depressed.

It is also the object of this mechanism to prevent the release of the machine unless the depressed transaction keys are completely depressed. This is accomplished in the following manner. When the transaction key is depressed and the detent 51 is lowered, the arm 165 will be rocked counter-clockwise as above described. This will bring the projection 166 thereof into the path of the downwardly extending portion of the arm 167, which is fast on the release shaft. As the key is completely depressed, the projection 166 will be moved to its normal position out of the path of the downwardly projecting portion of the arm 167, and, therefore, the machine may be released. If, however, the key is not completely depressed the projection 166 will stop in the path of the downwardly projecting portion of the arm 167 and will prevent the releasing movement of the shaft 38 and, consequently, prevent the release of the machine.

Differential mechanism

The differential mechanism of the machine is employed to differentially operate the different totalizers and to select them for operation, and also to set type carriers in the printing mechanism as controlled by the banks of keys. The amount differential mechanism will be described first.

Amount differential units

There is one complete differential unit for each amount bank, but, as they are all identical in construction and operation, only one will be described.

To drive the differential mechanism of the machine the drive shaft 26 is provided with a plurality of pairs of cams 181 (Figs. 2 and 8), each pair cooperating with rollers 182 carried by a Y-shaped lever 183 of which there is one for each bank of keys in the machine. Each of these levers 183 is pivoted on a corresponding frame or hanger, not shown herein, but of well known construction. Loosely mounted on hollow studs 184 carried by said hangers, are differentially movable actuators 185 carrying racks 186 and transfer arms 187 for operating totalizer pinions 188. The levers 183 at their upper ends are connected by links 189 (Fig. 8) to driving segments 190 loose on the hollow studs 184. The driving segments 190 adjacent the banks of amount keys are connected to the differentially movable actuators 185 by latches 191, each of which is supported by an arm 192 and a lever 193 pivoted on the corresponding differentially movable actuator. Springs 194 hold the rear ends of the latches 191 in engagement with shoulders on the driving segments. When the segments 190 are driven by their cams 181 the differentially movable actuators 185 are carried, with their latches, up to points where the forwardly extending arms of the levers 193 engage the inner ends of the depressed amount keys. Such engagement results in disengagement of the latches from the driving segments and engagement of the forward ends of the latches with the particular one of a series of notches 195, formed in a bar 196, supported by the differential supporting frame, which is opposite the latch when it is disengaged. Upon return movement of each driving segment to normal position, a pin 197 mounted on the associated differentially movable actuator 185 is engaged by the inside of the driving segment 190 and said actuator 185 is returned thereby to its normal position. If a key is not depressed in an amount bank the zero stop pawl 40 therefor operates the latch to arrest the differentially movable actuator in its zero position. However, when a key is depressed, the zero stop pawl is moved out of its operative position, as above described.

Transaction bank differential mechanism

As the three transaction banks serve to select the totalizers, but not to accumulate thereon, no differentially movable racks are used in connection with these banks. With the exception of this fact, however, the differential mechanisms for these banks are identical with that shown and described for the amount banks and the same reference numerals are used to indicate like parts. It can be seen from Fig. 11 that there are two cams 181 which drive a Y-shaped lever 183 connected by a link 189 to a driving segment 190. This driving segment cooperates with a differentially movable arm 200 carrying a latch 191 identical with the latch 191 for the amount banks, said latch being supported by an arm 192 and a lever 193. When the cams 181 are rotated, the segment 190 through the link 189 and Y-shaped lever 183 will raise the differentially movable arm 200 due to the engagement of the latch 191 with a shoulder on said driving segment, until the outer end of the lever 193 comes into contact with whichever one of the keys in these banks is depressed. When this occurs the latch 191 will be disengaged from the shoulder and the forward end of said latch will engage one of a plurality of notches 195 in a bar 196. If no key in the transaction banks is depressed, the zero stop pawls 64 therefor will engage the ends of arms 201 pivoted about the rod 184 and which at their forward ends have slots through which project pins carried by the levers 193, and thereby cause these levers to be rocked to disconnect the latches for these banks in the zero position, as in the amount banks. If one of these keys has been depressed, the corresponding stop pawl for that bank will be rendered inoperative. There are various oscillatory controls for the zero stop pawls for the transaction banks which are used in order to properly select the desired totalizer, and they will be taken up and fully described under the heading of "Totalizers".

Appropriate to each amount differential mechanism and to each transaction bank is a beam 205, (Figs. 8, 11 and 13) pivoted at one end to its differentially movable actuator 185 or arm 200 and bifurcated at its opposite end to straddle a roller 206 carried by a link 207. The beam 205 is adjusted by a roller 208 carried by the Y-shaped lever 183 in a well known manner. At their lower ends each of these links 207 is pivoted to an arm 209 fast to a spiral segment 210 loose on a shaft 211 supported by the machine side frames. These spiral segments 210 mesh with spiral gears 212 fast on the inner ends of shafts 213 which, through mechanism to be described later, set up the type wheels for printing the amount and other data on the various record retaining means.

At their upper ends the links 207 are pivoted to segments 215 fast on nested sleeves 216 supported by a shaft 217. An alining bar 218 carried by a plurality of arms 219 fast on a shaft 220 is adapted, normally, to engage teeth 221 formed on the segment 215. When the differential mechanism is operated, the bar 218 will have been moved out of the teeth 221 and when the differential movement is complete they will be again moved into engagement therewith to properly aline and hold the various mechanisms, set up by the differential mechanisms, in their set positions. The means for operating the bar 218 is old and well known in the art, and it is not, therefore, either shown or described herein.

*Totalizers*

The totalizers used in the present machine are old and well known in the art, and, therefore, no detailed description of them will be given herein. If such a description is desired, reference may be had to the patents previously mentioned.

There are three lines of totalizers in the machine. Two of these lines, that is, the front and back lines, consist of eight groups of totalizer pinions, each loosely mounted on a tube 231 supported by frames 232 (Fig. 8). These frames are slidably mounted on a shaft 233. Each totalizer consists of a plurality of pinions 188, one pinion in each group of pinions. Therefore, if the first pinion of each group is engaged with the differential actuators, a certain totalizer will be actuated. If the second pinion in each group is engaged, a different totalizer will be operated, etc.

The upper totalizer line carries an adding and subtracting totalizer, there being but the one totalizer on this line. This totalizer consists of a plurality of totalizer pinions 235 and 236 (see Fig. 7), the pinions 236 being engaged with the actuators for subtracting and the pinions 235 for adding. All are loosely mounted on a shaft 237 which is carried by frames 238 and 232 slidably mounted on a shaft 239.

These pinions 235 and 236 operate in pairs, that is, one adding and one subtracting pinion cooperate for each denomination. Fast to the sides of each of these pinions are bevel gears 240. Each pair of totalizer pinions has two beveled pinions 241 meshing with the pair of bevel gears appropriate thereto. When one of the totalizer pinions is rotated, the other pinion of the pair is rotated in the opposite direction so that when the subtracting pinions are in mesh with the actuating racks 186, the adding pinions will be actually turned backwardly an extent corresponding to the movement given the subtracting pinions by the actuating racks 186.

Means are provided for notifying the operator whenever, during an operation, the totalizer wheels pass over the zero positions. This will happen when subtracting a larger amount from a smaller one, which will leave a negative amount on the subtracting wheels, or when adding a greater amount to the adding wheels than stands on the subtracting wheels, which will leave a positive amount on said adding wheels.

Rigidly connected to the adding wheel 235 of highest denomination by means of a sleeve 915 (Figs. 7 and 54) is a disk 916 which has fast to its side a bevel gear 917 identical with the gears 240 above described. Meshing with this gear are two bevel pinions 918, which also mesh with another bevel gear 917 fast to a disk 919. The disks 916 and 919 have noses 920 and 921 respectively, which, when this totalizer is in engagement, are adapted to cooperate with a toe 922 of a bell hammer 923. This hammer is pivoted on a plate 924 supported by the differential unit supporting rods. Mounted on the stud 248 is a bell 925.

When the adding and subtracting totalizer is in engagement with the actuators, and the wheels are given a sufficient rotation to move them from 0 to 9, or vice versa the nose 920 or 921, depending whether the adding or subtracting wheels are in engagement, will contact the toe 922 of bell hammer 923 and rock this hammer counter-clockwise against the influence of a spring 926. This movement will continue until the nose 920 or 921 becomes disengaged from the toe 922, whereupon the hammer will be rotated violently clockwise (Fig. 54) by the spring 926 to ring the bell.

Means are provided in the present machine for transferring from totalizer elements of lower order to those of higher order. As this mechanism is identical with that described in the before-mentioned patents and application no description thereof will be given herein.

Totalizer selecting mechanism

In order to shift the totalizer lines so as to bring any desired one of the totalizers opposite the differential actuators (Fig. 7), the frame 238 of each of the totalizer lines carries a boss 243 in which is secured a rod 244 provided with a roller 245 extending into a cam groove 246 in a cam 247 rotatably mounted on a stud 248 projecting from the side frame. There is one of these cams for each totalizer line. As the balance totalizer has to be slid only a short distance, the cam for this line is of a somewhat different shape from the others. Each cam has a rearwardly extending arm 249 to which is pivoted a link (not shown), which at its opposite end is pivoted to an arm (also not shown), fast on the left hand end of the shaft 217 or one of the sleeves 216. Also secured to this shaft or the corresponding sleeve surrounding it, are the segments 215 to which the links 207 operated by beams 205 are pivoted. The front totalizer is controlled by the third transaction bank, the back totalizer by the second transaction bank, and the balance totalizer by the balance bank. It can be seen, therefore, that the cams 247 are differentially positioned as determined by their corresponding transaction banks. The movements of the cams will cause the totalizer line appropriate thereto to be shifted laterally of the machine to move the desired totalizer pinions into positions to be operated.

Totalizer engaging mechanism

Mechanism for engaging the selected totalizer pinions with the actuators for the purpose of operating these totalizers will now be described. Near the end of each of the shafts 239 or 233 are arms 250 (Fig. 7), each carrying a roller 251 projecting into cam slots (not shown herein) in plates 252 fixed to the side frames. Pivoted to the right hand one of these arms 250 on each shaft (Fig. 7) is a link 253 moved by a mechanism, not shown herein, but well known in the art, to rock the shafts 239 or 233 clockwise (Fig. 8). This movement of the shafts 239 and 233, through the engagement of the rollers 251 with the slots in plates 252, causes these shafts and arms 238 and 232 carrying the totalizers to be slid toward the center of the machine, whereby the totalizer pinions of the selected totalizer will engage the racks 186. This engagement takes place in adding operations after the differential actuators have been positioned under control of the depressed keys. When said actuators are restored to normal positions the amount which was placed thereon is accumulated on the totalizer pinions, after which the links 253 are moved to disengage said pinions from the differential racks 186.

When the shaft 233 (Fig. 8) is rocked clockwise, as above described, a pair of pawls 255 fast thereon engage shoulders 256 of levers 257 pivoted on a rod 258 and rock said levers clockwise. These levers carry an alining bar 259 normally in engagement with all of the pinions 188 on that particular totalizer line when they are out of engagement with the differential mechanism. When the levers 257 are rocked clockwise by the pawls 255, the bar 259 will be withdrawn from the pinions 188 to allow the selected ones to be rotated. When the pinions are disengaged from the racks 186 the alining bar 259 is again moved into engagement with said pinions.

Engaging controlling mechanism

The mechanism for engaging the selected totalizers with the actuators, that is, the mechanism which operates the links 253 (Fig. 7), is not shown herein, neither is the mechanism for determining, under the control of the transaction banks, which of the totalizer lines will be engaged on adding operations. Neither of these mechanisms has any bearing on the present invention, and as they are very fully shown and described in several of the preceding patents referred to above, it is thought to be unnecessary to disclose any portion thereof in this application.

Mechanism for selecting the adding side of the balance totalizer under control of certain keys in the second and third transaction banks The second transaction bank may be divided into two parts. The five uppermost keys in this bank are debit keys and therefore, any amount which may be entered, with one of these keys depressed, is added to the balance totalizer. When one of these keys is depressed, it is necessary to provide mechanism for causing the balance totalizer to move from its subtracting to its adding position, as its subtracting position is its normal one. This bank of keys is associated with a lever 260, best shown in Fig. 16, which is adapted to cooperate with the five uppermost keys in this bank. The lever 260 has fine inclined noses 261 adapted to cooperate with pins 262 carried by each of the five upper keys in the second transaction bank. When any of the five uppermost keys are depressed the lever 260 will be rocked counter-clockwise about its pivot, as seen in Fig. 16, against the tension of the spring 263 extending between said detent and any suitable point on the frame. The lever 260 has a downwardly extending arm 264 which is bifurcated and straddles a pin 265 carried by an arm 266 loose on the rod 32. Connected to the arm 266 by a yoke 267 is a hook 268 which cooperates with a pin carried by an arm 269 fast on a short shaft 270 to which the zero stop pawl 64 for the balance bank is also fast. It can be seen from the above description that when the lever 260 is rocked counter-clockwise by the depression of a key, the arm 266, yoke 267 and hook 268 will be rocked clockwise about the rod 32. The engagement of the hook 268 with the pin on arm 269 will cause this arm, shaft 270 and zero stop pawl 64 to be rocked counter-clockwise a sufficient distance to render the zero stop pawl ineffective. Therefore, when the machine is operated, the latch for the balance bank will not be disengaged by the zero stop pawl 64, and as there are no keys depressed in this bank the latch will be moved up to, and be disengaged in the "9" position, as is well known in the art. This movement of the latch will, through the beam 205, link 207, segment 215, one of the sleeves 216, the arm and link (not shown herein), position the cam 247 to its "9" position, which will bring the adding side of the balance totalizer opposite the differential actuators 185.

It will be noted that all of the keys in the third transaction bank are for registering charge items, and, therefore, all of these keys must select, in addition to their own totalizers, the adding side of the balance totalizer. The machanism for effecting this selection will now be described.

Cooperating with the third transaction bank is a control bar 280 (Figs. 3) which is pivotally carried by arms 281 similar to the arms 141 of the second transaction bank. This bar has inclined portions each adapted to cooperate with a pin projecting from each of the keys in this bank. Near its upper end the bar carries a pin 282 which normally contacts an arm 283 pivoted on the shaft 116. Also loose on the shaft 116, but secured to the arm 283, is an arm 284 which at its opposite end is pivoted to a link 285. At its lower end this link is pivotally connected to an arm 286 (Fig. 6) loose on a shaft 287 supported by the side frames. Loose on the shaft 287, but connected to the arm 286 by a yoke 288, is an arm 292 connected to a pitman 289 (Figs. 5 and 6) which at its left hand end is bifurcated and straddles the shaft 54. This pitman has an upwardly extending arm 290 which contacts a pin 291 carried by the zero stop pawl 64 appropriate to the balance bank. A lug 279 normally contacts the hollow studs 184, and prevents any movement of the pitman 289 towards the right. When any key in the third transaction bank is depressed the bar 280 will be moved downwardly and due to the contact of the pin 282 with the arm 283, will rock this arm and the arm 284 counter-clockwise about the shaft 116, which will raise the link 285 and rock the arm 286, yoke 288 and arm 292 counter-clockwise about the shaft 287 to push the pitman 289 forwardly and cause the upwardly extending arm 290 thereof, through the pin 291, to rock the zero stop pawl 64 counter-clockwise (Fig. 5) to its ineffective position. When this takes place, the latch of the balance bank differential is free to move upwardly, upon the operation of the machine, and it will break in the "9" position, thereby selecting the adding side of the balance totalizer for operation when any of the keys in the third transaction bank have been depressed.

*Controlling the latch in the balance bank by the opening balance key*

The conditions under which the "opening balance" key is used have been previously described. It will be remembered that this key is used to reopen the guest's account by printing on the audit strip and adding to the balance totalizer the amount of the closing balance taken the previous night by the night auditor, when another charge item is to be entered. This opening balance is entered on the balance totalizer and the amount thereof printed in the balance column of the audit strip. If any of the other debit keys in the second transaction bank were depressed, the zero stop pawl in the balance bank would be rocked out as just above described, and the latch of the balance bank differential would break in the "9" position. As these debit keys, with the exception of the opening balance key, are all charge items, the "9" position of the balance bank which is selected by there keys will select the charge column on the audit strip. When the opening balance is printed, however, it is not desired that it should be printed in the charge column, and, therefore, mechanism is provided to disconnect the latch of the balance bank differential mechanism, which selects the various columns, in its sixth postion, which position is appropriate to the opening balance key only, and will select the balance column. This position on the differential mechanism will also select the adding side of the balance totalizer. The mechanism whereby the balance bank differential is arrested in the sixth or opening balance position will now be described. As can be seen from an inspection of Fig. 57, the opening balance key is in the ninth position of the second transaction bank.

This key has a projecting pin 293 (Fig. 4) which normally lies just above the left hand end of a lever 294 pivoted loosely on the shaft 38. At its opposite end the lever 294 (see also Fig. 11) is pivotally connected to a link 295, which at its lower end is pivoted to an arm 296 loose on the shaft 287. The arm 296 is connected by means of a yoke 297 to an arm 298 (Fig. 13).

The bell crank lever 193, which supports the forward end of the latch which cooperates with the balance bank differential mechanism, has a pin projecting laterally therefrom which extends through a slot formed in the left hand end of one arm of a bell crank lever 300 (Fig. 13). It is evident that if an obstruction should be placed in the path of the upwardly extending arm of the bell crank lever 300, as said lever is rocked clockwise, the bell crank lever 193 would be rocked counter-clockwise (Fig. 13), which would disconnect the latch from the driving segment 190.

When the opening balance key in the second transaction bank is depressed, the lever 294 will be rocked counter-clockwise (Figs. 4 and 11), which will raise the link 295 and rock the arm 296, yoke 297 and arm 298 slightly counter-clockwise. This movement of the arm 298 will position it in the path of the upwardly extending arm of the bell crank 300. Therefore, when the machine is operated and the latch of the differential mechanism for the balance bank moves upwardly, the end of the upwardly extending arm of the bell crank 300 will come into contact with the end of the arm 298 and the latch for this bank will be disconnected from the driver. The parts are so proportioned that this disconnecting of the latch will occur when the differential mechanism reaches the sixth position, in which position there is, of course, no key. It will be hereinafter described how the disconnecting of the latch in this position selects the balance column of the audit strip to receive the impression from the type-wheels.

*Printing mechanism*

The printing mechanism is located in front of the machine proper. The framework for this mechanism comprises a front frame 310, an intermediate frame 311, and a rear frame 312 (Fig. 21).

The entire printing mechanism is driven by the operation of the cash register. The main drive shaft 26 of the cash register has secured near its left hand end a spiral gear 313 (Fig. 18) which meshes with a spiral pinion 314 fast on a sleeve 315 loose on a shaft 316. The front end of the shaft 316 is mounted in the frame 310 and the rear end thereof in a bracket 317 secured to the base of the machine. Fast on the sleeve 315 is a disk 318 upon which is pivotally mounted a driving pawl 319 and a retaining pawl 320 held in their normal positions by a spring 321 stretched between them. Secured to the shaft 316 is a disk 322 provided with a boss 323 normally engaged by the driving pawls 319. From the above description it can be seen that the clockwise rotation of the main driving shaft 26 rotates the disk 318 counter-clockwise (Fig. 19), and through the engagement of the pawl 319 with the boss 323 rotates the shaft 316 to a like extent. The pawl 320 serves to retain the shaft 316 against any excessive overthrow movement.

*Racks*

It will be recalled that meshing with each of the spiral segments 210 (Figs. 2, 8, 11 and 13) actuated by the movement of the various differential units is a spiral gear 212 secured to a shaft 213 mounted on the frames 311 and 312. Secured to each of these shafts is a segment 325 (Fig. 43). Meshing with segments 325 are teeth formed on the lower edges of racks 326 slidably mounted on a plurality of rods which extend through slots 327 therein and are supported by the frames 311 and 312.

The movement of the differential mechanism through the spiral segments 210, spiral gears 212, shafts 213 and segments 325 is imparted to the racks 326.

*Room number and cashier's letter racks*

The room numbers are recorded on the cards and audit strip, and appropriate differential mechanism is provided which is controlled by the keys 75 (Figs. 1 and 57) for setting up these numbers on the type carriers. This differential mechanism and the racks which are appropriate thereto to set up the room number type carriers are not shown herein, but are shown in the above mentioned Shipley Patent, No. 1,619,796. In Fig. 45 there are shown two of the racks which are set up by the cashier's key, and these racks are substantially the same as the racks actuated by the room number differential mechanisms.

There are two racks 330 which are operated by the cashier's key. They are adapted to be slid laterally upon two rods 331 which project through slots 332 therein. On their lower edges each of these two racks has teeth 333 which engage teeth formed on an upwardly extending arm 334 of a slide 335 supported by two rods 336. These slides 335 are held in their normal right hand positions by means of springs 337 connected to the slides and a rod 338 projecting from the machine frame. Each of the slides 335 is provided with a downwardly extending nose 339 which lies in the plane of a pin or ward 340 carried by the cashier's key. It can be seen from the above that when the cashier's key is inserted, the pins 340 carried thereby will come into contact with the noses 339 of the slides 335 and will slide them toward the left, and as these slides are connected to the racks 330 by means of the teeth 333 the racks will also be moved a corresponding distance toward the left. It is evident that the pins 340 can be placed in any one of a number of positions to give a variation of combinations so as to provide for the required number of cashiers. Each of the racks 330 meshes with a pinion 341 fast on a shaft 342 or on one of a plurality of sleeves 343 supported thereby. At their opposite ends the shaft 342 and the sleeves 343 carry gears 361 (Fig. 26) meshing with certain gears 374 to be later described, which will in turn set up the type-wheels to print the cashier's letter upon the audit strip.

Rack aliners

The racks 326 and 330 have alining notches 345 and 346 respectively cut therein. Cooperating with these notches are two aliners 347 and 348 (Fig. 41). A shaft 349 has secured thereto two levers, each having two arms, 350 and 351 projecting into slots in said aliners. After the racks are properly positioned the shaft 349 is rocked counter-clockwise, which movement through the arms 350 and 351 will move the aliners 347 and 348 into engagement with the notches 345 and 346. This engagement is maintained until near the end of the operation, when the parts are returned to normal.

The means for rocking the shaft 349, as above described, consists of an arm 352, fast thereon, and to which is pivoted a link 353 pivoted at its opposite end to a lever 354 (Fig. 40) loosely mounted on a stud 355. This lever 354 carries two rollers 356 and 357 which cooperate with a pair of cams 358 and 359 respectively, fast on the printer drive shaft 316. The shaft 316 is given one complete counter-clockwise rotation (Fig. 40) upon every adding operation of the machine, and through the cams 358 and 359 will rock the lever 354 clockwise, which movement, through the link 353 and arm 352, will rock the shaft 349 counter-clockwise, and thereby move the rack aliners into engagement with the rack alining notches 345 and 346 formed in the racks 326 and 330 respectively. At the proper time, the cams 358 and 359 reverse the movement of said parts to disengage the aliners 347 and 348 from the racks 326 and 330, respectively.

Tube lines

Associated with the racks 326 are two tube lines which, with their cooperating mechanism, are for the purpose of setting the various type-wheels. These tube lines are supported by shafts 370 and 371 (Figs. 26, 37, 41 and 43) supported at their rear ends by the frame 312, passing through frame 311, and supporting at their forward ends a plate 373 (Figs. 29 and 42). The teeth on the racks 326 mesh with the teeth of gears 374 fast, either to the shafts 370 and 371 or to the tubes surrounding these shafts.

It will be remembered that this machine is adapted to print amounts in any one of three columns. In order to accomplish this there are provided three complete sets of amount type-wheels on each of the upper and lower type lines. These type-wheels 375 are supported by shafts 376 and 377 (Figs. 26, 29 and 41). The upper type line, which is adapted to print on the audit strip and charge slip, is shown in Fig. 42. When the racks are actuated to set up the type-wheels, the same amount will be set up on all three groups of type on both the upper and lower type lines. The column in which the amount is to be printed is selected by mechanism which will be hereinafter described, and this mechanism permits the actuation of whichever one of a plurality of hammers corresponds to the position on the paper of this column.

As can be seen from Fig. 26, the two type lines are located one directly over the other, and the type-wheels of both lines are connected by intermediate gears 378 and 374 so that if one of said type wheels or gears is actuated the movement thereof will be transmitted to the other type line and the appropriate wheel thereon will receive a similar movement. The manner in which the same type-wheel in all six groups will be given the same actuation is not shown or described herein. For a description of this mechanism reference may be made to the Shipley application No. 610,273, above mentioned.

The date is printed on both of the record cards and the charge slip on each operation, but not on the audit strip. A series of sleeves having knurled flanges 380 (Figs. 1 and 29) project through the plate 373 and are connected with the date type-wheels 381 (Fig. 42). These wheels may be adjusted manually by means of the knurled flanges 380.

On the opposite side of the three groups of amount type wheels 375 are three type wheels 382 adapted to be set by the transaction banks. To the right of these wheels, as seen in Fig. 42, is a type-wheel 383 set by the total lever. The next two wheels 384 towards the right are those set up by the cashier's key. After these come four wheels 385 which print the room number, and the last type-wheel 386 prints either "A" or "B" after the room number.

Type-wheel aliners

Mechanism is provided to aline the type-wheels before an impression is taken therefrom. In order to accomplish this result an aliner 400 (Fig. 41) is used and is carried by a pair of arms 401, only one of which is shown in this figure, loose on the shaft 376.

The rear arm 401 carries a pin 402 which projects through the bifurcated portion of an aliner operating slide 403. This slide has two slots formed therein through which the shafts 376 and 377 project. The slide 403 has another notch 404 into which extends a pin 405 carried by a bell crank lever 406. The other arm of the bell crank lever is bifurcated and straddles a pin 407 mounted in an arm 408 fast on a shaft 409 supported by frames 311 and 312.

Also fast on shaft 409 is an arm 410 which carries a pin projecting through a slot cut in the link 353. Attached to this pin is a hook 411, which at its other end is fastened to a spring 412 which is in turn attached to link 353. Another arm 417 is also fast on the shaft 409 and is so positioned that its right hand end is normally just below the beveled end of an arm 413 loose on a stud 414 projecting from frame 312. Secured to arm 413 and supported by stud 414 is another arm 415 which extends downwardly and lies adjacent a pin 416 carried by link 353.

When the link 353 is moved towards the right to actuate the rack aliners, the pin 416 will bear against the arm 415 and rock this arm and arm 413 counter-clockwise (Fig. 41). As this movement continues the end of arm 413 will gradually move away from arm 417. As the link moves, the spring 412 will be stretched, the arm 417, shaft 409 and arm 410 being held stationary due to the contact between arm 417 and arm 413. When arm 413 moves out of the path of arm 417 the latter arm will be given a fast counter-clockwise movement by the spring 412 to the extent of the slot in link 353. This movement will be transmitted through shaft 409 to arm 408, which will in turn rock the bell crank 406 clockwise, thereby raising the slide 403 and rocking the arm 401 clockwise, which will lower the aliner 400 into engagement with the gears 374 carried by shaft 371. As these gears engage both type lines, it is evident that all the type-wheels will be alined.

It can be seen that the aliners 347 and 348 will be operated before the aliner 400 is moved so that the racks and type-wheels are brought into approximate alinement. Then when the aliner 400 snaps into contact with the gears 374 the type-wheels will be brought into exact alinement and will be so held until a printing impression has been made therefrom.

Audit strip mechanism

The audit strip mechanism of the present machine is similar to the detail strip mechanism shown and described in the before mentioned patents and application, and, therefore, only a general description of this mechanism will be given herein except those parts which differentiate from previous constructions. The audit strip retains in the machine a complete record of every operation of the machine, and is used to audit the accounts of each cashier.

The strip is carried on a storage roll 425 (Fig. 26), from which it passes about the right hand one of a pair of shifting rollers 426 supported by an arm 424 pivoted on the frame 311. From the roller 426 the strip passes to the right and passes over a shaft 427 also supported by frame 311. The strip then passes around three rollers 428 carried by plates 429 (Fig. 29) fast to each end of a block 430 which supports the upper platens, as will be later described. After passing around the upper one of rollers 428 the strip passes to the left and around the other of the pair of shifting rollers 426 (not shown). The strip then passes onto a receiving roll (not shown).

Audit strip feeding

The mechanism for feeding the audit strip between impressions is not shown herein nor will it be described, as it forms no part of this invention. It is thought to be sufficient to say that the strip is given a movement of one step upon each operation of the machine.

Audit strip shifting

As can be seen from Fig. 1, the audit strip is located beneath a glass 432 in the top of the printer cabinet. Mechanism is provided herein to shift the strip from its normal position where the last item is visible under the glass, to its printing position and then back again to its normal position. This mechanism is well known in the art and is only partially shown herein. Fig. 26 shows one of a pair of shifting rollers 426. During the operation, the arms carrying these rollers are rocked so as to bring the rollers first toward each other and then back to normal. As they approach each other the strip will be shifted from normal visible position to the printing position. As the rollers return to normal the strip will be moved likewise.

The mechanism for causing the paper strip to be shifted in this manner will now be briefly described. The arm 424 which carries the right hand one of the rollers 426 has rigid therewith an arm 433 cooperating with a roller 434 mounted on one arm of a bell crank lever 435 (Figs. 26, 29 and 31) loose on a shaft 437. The other arm of the bell crank lever 435 carries a roller 436 (Fig. 31) which projects into a cam groove 437 in a disk 438 fast on the printer drive shaft 316. This shaft is given a counter-clockwise rotation on every operation of the machine and the cam groove is so designed that the bell crank lever 435 will be rocked clockwise and then counter-clockwise to normal position. This movement will rock the arm 424 counter-clockwise and then clockwise and the other shifting arm clockwise and then counterclockwise in order to shift the audit strip as above described.

Upper impression mechanism

Loosely mounted on the shaft 427 is a frame comprising two side arms 439 and 440 (Figs. 26, 29 and 58) and a cross bar 441. At the right hand ends of these side arms is a block 430 which supports a plurality of platens 442. In order to take an impression from the upper type-wheels it is necessary to rock the frame clockwise (Figs. 26 and 29) and thereby bring the platens 442 into contact with the type-wheels. This is done in the following manner. Fast to the arm 440 is an arm 444 pivoted to a link 445, which at its lower end is pivoted to a lever 446 (Figs. 26 and 27) loose on a shaft 447 supported by frames 310 and 311. At its left hand end this lever carries two rollers 448 and 449 cooperating with two cams 450 and 451 respectively (Figs. 27 and 32), pinned to the shaft 437. Also fast on this shaft is a Geneva wheel 452. A disk 453 slidably mounted on shaft 316, and connected thereto for rotation therewith by a key and key-way, carries two pins 454 and 455, adapted to cooperate with the Geneva wheel. The shaft 316 and the disk 453, are rotated in a counter-clockwise direction (Fig. 27) on every operation of the machine. The pins 454 and 455 will each, in turn, engage a notch in the Geneva wheel and give said wheel a partial rotation, which through the shaft 437 will rotate the pair of cams 450 and 451 to a like extent. These cams are so shaped as to rock the lever 446 clockwise and then counter-clockwise to normal once for each step of movement of the Geneva wheel 452 by each pin on the disk 453. This movement, through link 445 and arm 444, will lower the platen frame twice, once to print on the charge slip, and again to print on the audit strip, as will be presently described.

Disabling date platen

The audit strip is not wide enough to receive an impression from the date type-wheels on the upper type line. Mechanism is, therefore, provided for automatically disabling the date platen after the first impression on the charge slip is made. The date platen 442 (Figs. 29 and 58) is carried by a U-shaped bar supported by a cylindrical plunger 460 slidably mounted in the platen supporting block 430. A lever 461 pivoted on a rod 462 projects into an opening in the plunger 460. At its opposite end this lever cooperates with a cam 463 fast on a short shaft 464 supported by the arm 439 and a projection of the block 430. Also fast on the shaft 464 is an arm 465 connected by a link 466 to an arm 467 fast on a shaft 468 supported by the arms 439 and 440. The inner end of this shaft carries an arm 469 connected by a link 470 to a lever 471 (Figs. 26 and 29) loosely mounted on a rod 472 which also supports the audit strip storage roll 425. This lever has a slot formed therein into which projects a roller carried by the paper shifting arm 424 above described. It will be recalled that this arm is rocked first counter-clockwise and then clockwise on each operation. The lower portion of the slot is concentric with the path of the roller carried by arm 424 so that the first one-half movement of the arm 424 will have no effect on the parts above described. During this period the first impression is taken, which prints the date on the charge slip.

When, however, the roller on arm 424 strikes the vertical portion of the slot the arm 471 will be rocked counter-clockwise (Fig. 29). This movement, through link 470, arm 469, shaft 468, arm 467, link 466, arm 465 and shaft 464 will rock the cam 463 counter-clockwise. As this cam cooperates with the lever 461 this lever will be rocked also counter-clockwise, which will raise the plunger 460 and platen 442 far enough to prevent an impression being made.

Platen selecting mechanism

It will be recalled that there are three sets of amount type-wheels on the upper type line, and the amount set up on the keyboard is set up on each of these sets. An impression is taken, however, from only one of these sets, depending on the character of the entry and in which column it is desired to print the amount.

Besides the date platen which has been described, there are five other platens which cooperate with the upper type line. The date platen is the one nearest the front. Next behind it is the "Balance" platen, then the "Credit", then the "Charge", then the "Transaction" and lastly the "Room Number" platen. All of these platens are selected by the "Balance" bank differential mechanism.

The differential mechanism for this bank positions a link 207 exactly like the link 207 for the amount banks. This movement of link 207 is transmitted by means of an arm 209, spiral segment 210, spiral gear 212, and shaft 213 to a pinion 480 fast thereon, (Figs. 26 and 29) which meshes with teeth formed on a segment carried by an arm 481 pivoted on a stud in the frame 311. The arm 481 also carries a segment 482 which meshes with a pinion 483 loose on a stud 484 also mounted in frame 311. The pinion 483 is secured to a cam 485 with which two rollers 486 and 487, on a lever 488 cooperate.

Each of the platens is carried by a U-bar 489, which in turn is carried by a cylindrical plunger 490 slidably mounted in the block 430. Each plunger 490 has an opening into which projects the end of a lever 491, similar to the lever 461 for the date platen. These levers are loose on the rod 462 (Figs. 26 and 58).

The opposite ends of these levers are notched to form two points cooperating with a series of cams 492 fast on a shaft 493, carried by the platen frame. There is one of these cams for each of the three columns in which amounts are printed, and they are differentially spaced about the shaft 493. Also fast on this shaft is a short arm 494 pivoted to a link 495 which at its opposite end is pivoted to the lever 488.

When the differential mechanism for the "Balance" bank is operated, the cam 485 is rotated clockwise (Fig. 29). This cam is so shaped that the lever 488 is also rocked clockwise thereby, to any one of three positions depending on the position in which the latch of the "Balance" bank is disconnected from its driver. This movement will, through the link 495, and arm 494 rock the shaft 493 so as to bring the cam selected by the "Balance" bank into cooperative relation with its appropriate lever 491. In Fig. 26 the platen has been moved to its effective position. It is desired to have the "Transaction" and "Room Number" platens operate whenever an amount is printed in any of the three amount columns. Therefore, the cams 492 for these platens are so designed that these platens will be rendered effective whenever one of the "Balance", "Credit" or "Charge" platens are lowered.

The "Balance" bank selects the column in which an impression is to be made and moves the platen appropriate to that column to make the impression therein.

*Slip printing mechanism*

It has already been stated that when a charge is made in any department of the hotel a charge slip (Fig. 55) is made out therefor and after being O.K'd. by the guest is forwarded to the cashier. Means are provided herein for inserting this slip in the machine and printing the data thereon, which is entered by the machine on the account cards and the audit strip at the same operation of the machine. The slip is inserted in a recess formed just above the upper type line and rests on a table 500 (Figs. 26 and 29) supported in any suitable manner. It will be recalled that the upper platen is given two movements on every operation. The first of these prints the data set up by the keyboard on the slip. The slip is then ejected and the second impression is made on the audit strip. The mechanism for ejecting the slip will now be described. The slip is inserted between two knurled rollers 503 (Fig. 37) and two rollers 504 (only one of each is shown). The upper rollers 503 are carried by levers 505 pivoted on brackets 506 screwed to the machine frame 311 and the plate 373. Springs 507 are wound about the pivots of levers 505 and constantly tend to force the rollers 503 down into contact with roller 504.

The rear one of the levers 505 carries a pin 508 on which is pivoted a link 509 having a slot near its lower end surrounding a pin 510 mounted on the rear one of the type-wheel aliner arms 401 above described. It will be recalled that this arm is given a quick clockwise movement (Fig. 37) to aline the type-wheels. When this occurs the pin 510 moves upwardly in the slot in link 509 and permits the springs 507 to rock the levers 505 clockwise until projections 498 thereof is brought into contact with the pins 499. While they are in this position, the rollers 504 will be given a rapid clockwise rotation in a manner to be presently described, which will eject the charge slip from the machine. When the aliner 400 is released and returned to normal, the pin 510 will engage the end of the slot in link 509 and lower this link thereby raising the rollers 503 against the tension of their springs 507 to their normal positions, as shown in Fig. 37. The two rollers 503 are connected in the following manner. A shaft 511 supported by frame 311 and the plate 373 carries an arm 512 having a bifurcated end cooperating with the pin 508 on the lever 505. On the forward end of shaft 511 is an arm (not shown) exactly the same as arm 512 which cooperates with a pin on the front lever 505. It is evident, therefore, that any movement of the rear ejecting roller will be transmitted to the front roller so that they are moved together.

The means for driving the ejecting rollers is as follows. Secured to the side of each of the rollers 504 is a gear 513 meshing with a pinion 514 fast on a shaft 515 mounted in frame 311. The pinion 514 nearest the frame 311 meshes with a gear 516 loose on the rod 377. The gear 516 meshes with a gear 517 (Figs. 37 and 39) loose on a stud 518 on frame 311. Secured to the gear 517 is a ratchet 519, with which a driving pawl 520 pivoted on a pitman 521 cooperates. This pitman is bifurcated and rests on the stud 518. The pawl is held in engagement with the ratchet by spring means. The pitman is pivoted to an arm 522 mounted on a stud 523 (Fig. 39) on the frame 311. Pivotally attached to the arm 522 is a pitman 524 which has a slot 525 surrounding a collar on the shaft 316.

Fast on a shaft 526 (Fig. 39) is an arm 527 the end of which is adapted to partially surround and rest upon a flanged collar 528 supported by shaft 316. A slot 529 is formed in arm 527 and this slot carries a pin 530 (Figs. 32 and 39) projecting through an opening in pitman 524 and into a cam groove 531 in a cam disk 532 fast on shaft 316.

It can be seen from the above, that when the shaft 316 is given its counter-clockwise rotation (Fig. 39) the disk 532 will be given a like extent of movement, and, due to the shape of the cam groove 531; the pitman 524 will be moved towards the left (Fig. 39)

against the tension of a spring 533. When the pin 530 passes the high point in the cam groove it is free to move towards the right and will do so very rapidly under the influence of spring 533. The pitman 521 will be moved with pitman 524 through its connecting link 522 until the pawl 520 takes a position behind the next tooth of the ratchet 519. Then when the pitman 521 moves to the right the ratchet 519 and gear 517 will be given a quick counter-clockwise rotation. This movement will rotate the gear 516 clockwise, the shaft 515 and pinions 514 counter-clockwise, and gears 513 and knurled rollers 504 clockwise. As the rollers 503 are in contact with the rollers 504 at this time, the slip will be ejected from between these pairs of rollers onto the table from which it can be manually removed for filing.

Mechanism for disabling slip printing and ejecting means

On certain operations of the machine it is not desired to print on a charge slip, and no slip is inserted in the machine. During such operations the slip ejecting mechanism is disabled and does not operate and the upper impression mechanism is crippled so that only one impression is made instead of two.

It can be seen from Fig. 32 that the disk 453 is slidably mounted on shaft 316 and is made integral with the flanged collar 528 with which the arm 527 cooperates. It is evident that if the shaft 526 and arm 527 are moved towards the front of the machine the disk 453 will also be moved to a like extent.

The disk carries the two pins 454 and 455 (Fig. 32) which cooperate with the Geneva wheel 452 to drive the impression mechanism. The pin 454 is, however, twice as long as the pin 455. Therefore, when the disk 453 is moved towards the front, the pin 455 will be moved out of the plane of the Geneva wheel, leaving only the pin 454 to cooperate therewith. When the shaft 316 is rotated, the Geneva wheel will only receive one increment of movement, and, therefore, only one impression will be made by the upper platen, which will print on the audit strip.

It will also be remembered that the pin 530 (Figs. 32 and 39) which projects into the cam groove in disk 532 is carried by the arm 527 so that when this arm is moved forwardly this pin will be withdrawn from the said cam groove therefore when the machine is operated the slip ejecting mechanism will not be operated.

Means are provided for sliding the shaft 526 forwardly and then backwardly on every operation, if it is desired that such movement of the shaft should take place. This mechanism is well known in the art, and, will therefore, be described but briefly herein. It is best shown in Figs. 21, 25 and 36. A pitman 541 cooperates, at its left hand end, with a cam disk (not shown) fast on the main drive shaft 26 of the register. Near its right hand end the pitman is slotted and surrounds a stud 542 projecting from the side frame. To this pitman are pivoted two hooks 543 and 544 (Fig. 36). These hooks constantly tend to rock counter-clockwise (Fig. 25) due to the influence of springs 545 and 546 stretched between the pitman and an upwardly projecting arm 547 of each of the hooks 543. Each of these hooks has a notch 548 to cooperate with a pin 549 projecting laterally from the rear end of shaft 526. An additional hook 550 pivoted on the end of frame 312 normally holds the shaft 526 in its normal position due to its engagement with the pin 549.

Near the beginning of the operation of the machine the pitman 541 is moved rearwardly, taking both of the hooks 543 and 544 with it. If no obstruction is placed in their paths the hooks will rock counter-clockwise when their notches 548 come opposite the pin 549. Then, when the pitman 541 moves forwardly once more the shaft 526 will be carried with it, and disable the impression and ejecting mechanisms, as above described. If it is not desired to have these mechanisms disabled, both of the hooks 543 and 544 must be held down so as to prevent them from engaging the pin 549. If this is done these hooks will slide back and forward without in any way affecting the impression and slip ejecting mechanisms.

Controlling mechanisms for slip ejecting and impression means

There are several different means in the present machine for controlling the effectivity of the slip impression and ejecting means. The first of these to be described herein will be the "On and Off" knob. This knob 552 is shown in Figs. 21, 23 and 33 and is mounted on the forward end of a sleeve 554 surrounding a stud 555 supported by the frame 310. Fast to the inner end of this sleeve is a gear 556 which meshes with a gear 557 loose on a sleeve 558 surrounding shaft 526. The gear 557 meshes with a gear 559 fast on a sleeve 560 surrounding a shaft 561 supported by the frames 310 and 311.

Fast on the inner end of this sleeve 560 is an arm 562 (Fig. 36) which lies adjacent the downwardly extending finger of an arm 563, which arm, in turn carries a pin 564 which cooperates with one arm of a two-armed lever 565 pivoted on a stud 566 carried by a bracket 567 (Fig. 26) secured to the frame 311. This lever is shown in Fig. 36 in the position which it occupies when a slip is to be printed and ejected. In this position an arm 568 lies just above the hook 543 and prevents the engagement of the notch in said hook with pin 549. As above described, this condition of the parts will prevent the movement of shaft 526 and, therefore, prevents the crippling of the impression and ejecting mechanisms.

When, however, the knob 552 is turned to its "Slip Off" position, that is, when it is given a quarter turn in a counter-clockwise direction, the sleeve 560 and arm 562 will be rocked in a counter-clockwise (Fig. 36) direction through the train of gears above described. The arm 562 will strike the arm 563 and rock it clockwise about its pivot. This movement causes pin 564 to rock the arm 565 counter-clockwise far enough to move the arm 568 thereof away from above the hook 543. Therefore, when this hook is drawn back as above described, it will engage the pin 549 and when said hook is moved forwardly it will slide the shaft 526 forwardly to disable the impression and ejecting mechanisms.

The other means by which the impression and ejecting mechanisms are affected is controlled automatically by the three banks of transaction keys. When certain keys are depressed, such as the "Balance" and "Credit" keys, there is no slip to be printed on and, therefore, the impression and ejecting mechanisms are disabled. When, however, one of the keys denoting the entry of a charge item is depressed, it is desirable that the machine print on the charge slip, so that said mechanisms are made effective.

The left hand end of each of the three transaction racks 326 (Figs. 43 and 44) is formed with high and low spots. There are ten of these positions corresponding to 0 to 9. Cooperating with the left-hand end of these racks is a lever 570 pivoted on a rod 571 (Figs. 36 and 43) supported by frames 311 and 312. The right hand end of this lever is bent at a right angle to the main portion thereof to form a feeler finger 572 which rests upon the racks 326. At its left hand end the lever has a short right angled toe 574 which lies just above the hook 544.

It can be seen that when the transaction racks are adjusted, there will be either a high spot or a low spot, on each rack, directly below finger 572 of the lever 570. It will be remembered that the hook 544 is normally under spring tension towards an upward direction (Fig. 43) and, therefore, constantly tends to rock lever 570 clockwise but this can only be done if a low spot on all three racks is opposite finger 572. If this condition exists, the hook can move upwardly and engage pin 549 and move the shaft 526 forwardly to disable the impression and ejecting mechanisms.

If, however, one of the racks stops with a high spot under the finger 572, the lever 570 cannot be rocked clockwise, and the hook 544 will be held down, thus permitting the impression and ejecting mechanisms to operate.

The top rack in Fig. 44 is the rack appropriate to the first transaction or "Balance" bank. It will be noted that this rack has nothing but low spots, so that the slip mechanism will be disabled no matter in which position the rack stops. The lower rack in Fig. 44 is for the second transaction bank. The first four keys in this bank are for recording credit items which should be printed on a slip. To accomplish this the first four positions on the rack are high spots, which will prevent the hook 544 from rising, and the inserted slip will be printed upon. Likewise it is desired to have a slip printed on "Long Distance" telephone call charges, and, therefore, a high spot is located in the seventh position, which corresponds to the long distance key. The two keys in the eighth and ninth positions are the "Suburban Telephone" and the "Opening Balance". No slip is to be printed when either of these keys is used, so there are two low spots on the rack in the positions corresponding thereto.

Slips are printed upon the depression of any of the keys in the third transaction bank, so there are no low spots on this rack (Fig. 43) except in the zero position.

It can be seen from the above that whenever either of the two hooks 543 and 544 is permitted to engage the pin 549 the slip printer will be disabled. Thus, if the knob 552 is set in the "off" position and any key in the 1st, 2nd, 3rd, 4th or 7th position in the second transaction bank is operated, the automatic slip control mechanism causes the slip printer to function.

Guest's account and record cards

As above described, there are two cards printed by this machine. A facsimile of one of these cards is shown in Fig. 56. The other card is a duplicate of the one shown, with the exception that it is slightly longer to provide means for ejecting it while an impression is being made on the smaller one. The ruling of the columns and the printed designations thereof are the same in both cases. At the top of each card is a space in which the guest's name and his room number may be typewritten. Below this space there are twenty-four numbered lines. The card is divided into columns by vertical lines. This form of card is, of course, not the only one which can be used with the present invention, but it is the desired form for use with the invention illustrated.

Card carriage

The cards are placed on a table or carriage which is slidable crosswise of the machine to properly position the cards to receive an impression from the lower type-wheels. This carriage includes a card table 590 (Figs. 21, 47, 48 and 49), which is supported by bearings 591, one at each side thereof, slidably mounted on a shaft 592 supported by brackets 593 and 780 projecting forwardly from the front printer frame 310. Secured to the table 590 is a key guide plate 594, formed with a downwardly extending flange 595, the lower edge of which rests on a roller 596 rotatably mounted on a stud carried by an angle-iron 597 (Fig. 49) secured to a supporting plate 598. This plate is rigidly secured to a bracket 599 supported by the printer frame 310. It is clear from the above description that the carriage will readily slide laterally of the machine on the shaft 592 and roller 596.

Means are provided to prevent any radial movement about the shaft 592. The flange 595 of the plate 594 carries a channel bar 600 in which a roller 601 operates. This roller is supported by an upright flange of a bar 602 which is slidably attached to the under side of the supporting plate 598 for the purposes, to be later described. As the carriage slides laterally of the machine the roller 601 will move along the channel bar 600 and maintain the carriage in its proper horizontal position.

Guides for record cards

The shorter of the two cards is first placed on the carriage and slid into position between two parallel guides 604 (Fig. 47) which are secured to the sides of the card table 590. Secured to the guides are shields 605, which carry presser feet 606 (Fig. 48) for the purpose of holding the cards flat. The other card, which is longer than the card already inserted, is then placed in the machine on top of the first-mentioned card. It is guided to its printing position by two tapered guides 607, one on each side of the table. These guides extend from front to rear of the carriage and hold the cards in their proper printing positions.

Line selector

It is of course desirable to print the entries on the first available blank line. In order to simplify the setting of the carriage so that the machine will print on any desired line, a mechanism is provided which will greatly facilitate this operation. Just to the left of, and mounted for movement with the carriage, is a group of keys 608 (Figs. 47, 48 and 49) used to select the line on the card to be printed on. These keys are slidably mounted in the plate 594, which is screwed to the table 590. A casing 609 is supported above the plate 594 by flanges 610 and has openings therein through which the keys project. Below the guide-plate 594 is another guide-plate 611 (Fig. 48) which is secured at its left hand end by screws extending through a block 612 into the casing 609. The key shanks are tapered and when depressed extend through slots in guide-plate 611. The key shanks have shoulders formed thereon just below the casing 609 to limit their upward movement. They are maintained in their upper positions by springs 613 compressed between said shoulders on the keys and the guide-plate 594.

When a key is depressed to select any one of the lines on the cards it is held in depressed position by a detent 614 (Figs. 48 and 51) slidably mounted on four studs 615 depending from the guide-plate 594 and which extend through slots 616 in said plate. The detent has a tendency to move constantly toward the right (Fig. 51) under the tension of a spring 617 stretched between the detent 614 and a pin on plate 594. Each key has a notch 618 adapted to receive the detent 614 when the key is depressed. When a key is depressed, an inclined edge thereof contacts the detent and moves the same toward the left (Fig. 48) thereby releasing any key which may have been previously depressed. Then when the detent is returned to the right the key last depressed is retained in its depressed position by the detent engaging the notch 618.

After the key appropriate to the line on which it is desired to print has been depressed, the carriage is moved bodily by hand to the right until the lower end of the depressed key comes into contact with a stop. This stop consists of two plates 620 and 621, best shown in Fig. 50, which are pivotally mounted in upwardly extending flanges of the bar 602. Projecting downwardly from each of the plates 620 and 621 is a pin 622 (Fig. 48), and stretched between these pins is a spring 623 which rocks the left hand plate 620 counter-clockwise (Fig. 48) and the right hand one clockwise. It can be readily seen that should the carriage be in such a position that the depressed key is to the left of the plates, when the carriage is moved toward the right, the lower end of the depressed key will first come in contact with the left hand plate 620 and will rock said plate clockwise until it has passed the same. Then this plate 620 will return to its normal position and the key will strike the edge of the right hand plate 621. As this plate cannot be rocked in clockwise direction, the carriage will be brought to a stop. The parts are so designed that this position will bring the selected line in position to receive an impression. If the depressed key is on the right hand side of the stop plates 620 and 621, the depressed key will first engage the right hand plate 621 and rock it counter-clockwise and then engage the left hand plate, which will stop the carriage with the depressed key between the two plates.

The depressed key will be released only when a balance operation is recorded and in a manner to be hereinafter described. When the key is released, the carriage will be returned to its extreme left hand position (Figs. 47 and 48) by means of a powerful spring 623 (Fig. 48) fastened to the carriage by means of a clip 624 and to the supporting frame by a clip 625.

Shock absorber

When the carriage is moved, either by hand or by the spring 623, to any of its selected positions there will be a certain amount of shock when the carriage comes to a sudden stop. Means is provided for absorbing this blow, so as to prevent any damage to the mechanism. The bar 602 which carries the stop plates 620 and 621 is slidably mounted on studs 626 and 627. At its right hand end this bar has a right angled flange 628 (Fig. 48) in which is secured a rod 629. This rod carries two sleeves 632 and 633 which extend through a U-shaped bar 630 which is secured to the stationary supporting plate 598. A spring 631 surrounds the rod 629 and abuts shoulders formed on the inner ends of the sleeves 632 and 633. If the carriage is moving from left to right, and is suddenly stopped by the plate 621, the bar 602, and, therefore, the rod 629, will be slid slightly toward the right (Fig. 48) against the tension of the spring 631. As soon as the carriage has come to a stop the spring 631 will return it to its correct position. If the carriage is moving from right to left, the same thing will occur, except that the spring will compress against the shoulder on sleeve 632. The sleeve is held on the rod by a nut 634 which is locked in position by a second nut 635.

Record card impression mechanism

There are six separate platens 645 (Figs. 26, 29, 32 and 38) for making impressions on two record cards. Proceeding from the front these are the date, balance, credit, charge, department, and room number platens. All of these platens are carried by U-bars 646 supported by arms 647 which are pivoted on the rod 447 previously described and are actuated by mechanism to be presently described, to strike the cards a sharp blow in order to take impressions from the lower set of type-wheels 375.

Selecting mechanism for determining which of the platens will operate is provided, and will be presently described. As all of the platens are actuated by the same actuating means, which will be described first. Extending across the printing mechanism beneath all of the arms 647 is a yoke 648 (Figs. 26 and 32) which is pivotally mounted on the rod 447 by means of arms 640 and 649. These arms support a rod 650 to which are attached each of the springs 644 that hold the arms 647 in contact with the yoke 648. A link 652 (Figs. 30 and 32) pivoted to an arm 653 has a notch 651 engaging the rod 650. The arm 653 is fast on a hub 654, surrounding the shaft 437. Also fast to the hub 654 is an arm 655 having a sharp nose 656, which, together with a roller 657, is adapted to cooperate with two cams 658 and 659 fast on the periphery of a disk 660. This disk is slidably mounted on the printer drive shaft 316 and is connected thereto and rotated therewith by a key and keyway.

The shaft 316 is given one rotation in a counter-clockwise direction upon each operation of the machine. It can be seen that as the nose 656 of the arm 655 rides up on the high portion of the cam 658, the said arm 655, hub 654 and arm 653 will be rocked clockwise, and thereby rock the yoke 648 clockwise through the engagement of link 652 with rod 650. This rocking movement of the yoke is against the tension of a powerful spring 661, one end of which is attached to the yoke arm 649 and the other end to a pin on the frame 311.

This rocking of the yoke 648 away from beneath the platen carrying arms 647 permits them to rotate clockwise (Figs. 26 and 29) by means of gravity, assisted by a plurality of springs 644, one for each of the arms 647. Then when the nose 656 of arm 655 passes the high point of the cam 658, the spring 661 will rapidly rotate the yoke arm 649 and the platens counter-clockwise until a toe 662 of said yoke arm 649 comes into contact with a stop 663 on the base of the machine, whereby the yoke arm 649 will be stopped. The platens, however, will continue their counter-clockwise movement and strike the record cards a blow sufficient to take an impression from the type-wheels. In normal operations the top card is ejected after the first impression is made, and then the cam 659 causes another impression to be made on the second card.

Platen selecting mechanism

On each operation of the machine only certain ones of the platens are operated, and the means by which the platens to be operated are selected will now be described. Each platen carrying arm 647 has a finger 665, (Figs. 26, 29 and 32) which at its right hand end carries a pin 666. Cooperating with each of the pins 666 is a bell crank lever 667 loosely mounted on a rod 668 supported by the frames 310 and 311. One arm of each of these bell crank levers 667 normally rests just beneath the roller 666 of its appropriate platen carrying arm. The other arm of the bell crank lever is slotted to receive a pin 669 carried by a lever 670, pivotally mounted on a rod 671 also supported by the printer frames 310 and 311. The lever 670 carries a roller 672, which is adapted to cooperate with a cam disk 673 fast on a shaft 213, appropriate to the balance bank of keys. A spring 674 is stretched between a pin carried by the lever 670 and a pin projecting through frame 311, and maintains the roller 672 in engagement with the periphery of the cam 673. There is one of the cams 673 appropriate to each of the six platens in the lower impression mechanism. These cams have high and low spots on their peripheries and are differentially positioned by the balance-bank differential mechanism through the shaft 213, in a manner well known in the art. When the roller 672 on lever 670 is resting upon one of the high spots of its appropriate cam, the bell crank lever 667 will be held with its arm beneath the pin on the finger 665, which will retain the corresponding platen in its normal position, and will not permit this platen to be rocked downwardly and returned to take an impression. When, however, the appropriate cam is set to such a position that one of the low spots thereof is in contact with the roller 672 the lever 670 will be rocked clockwise by the spring 674, and through the slot and pin connection the bell crank lever 667 will be rocked counter-clockwise a sufficient distance to remove its arm from beneath the pin 666 on finger 665 of the platen supporting arm. Then, when the yoke 648 is rocked clockwise, as above described, the platen will also be rocked clockwise under the influence of gravity and a spring 644 stretched between the arm 647 and rod 650, and when the yoke is given its rapid counter-clockwise movement under the influence of the spring 661, the platen will be violently thrown against the back of the record cards, which will cause an impression to be taken thereon from the group of type-wheels appropriate to the particular column selected.

It is evident from the above that the cams 673 can be designed in a manner which will cause any of the six platens to be operated on any particular operation desired, and, therefore, the appropriate impression can be made in any one column or combination of columns on the record card on which it is desired to print.

*Card shield*

A shiftable shield 676 (Figs. 26, 28 and 38) is provided which has a plurality of openings through which an impression can be made from the type wheels 375 by the platens 645, the main object of the shield 676 being to prevent any possible smears from the ink ribbon which might occur if the shield were not provided. It can be seen from Fig. 38 that the shield does not cover the date platen at any time. The first position of the shield shown in this figure will permit the "Room number", "Transaction" and "Charge" platens to come in contact with the cards. When the shield 676 is moved one step to the left (Fig. 38) to the second position, it permits the "Room number", "Transaction" and "Balance" platens to print. When the shield 676 is moved two steps to the left to the third position it permits the "Room number", "Transaction" and "Credit" platens to print. The mechanism for moving the shield to these three positions will now be described.

The shield is slidably supported by a stud 677 (Fig. 28) mounted in the frame 311 and which projects through a slot 678 in an upwardly extending flange of said shield. An operating bar 679 is fast to the shield 676 and has a slot 680 therein through which a stud 681 mounted in frame 311 projects. This bar has a notch 682 formed therein through which extends a pin 683 carried by a lever 684. This lever is pivoted on a shaft 740 carried by frames 310 and 311 and to this lever a link 685 is connected. At its opposite end this link is pivoted to a multi-armed lever 686, which is loose on the shaft 213 appropriate to the balance bank. Fast on this shaft is a gear 687 which meshes with a gear 688 loose on a shaft 904 but held against lateral movement thereon by two collars 689. Fast to the side of gear 688 are two cams 690 which cooperate with two rollers 691 each carried by an arm of the lever 686.

It can be seen from the above that when the "Balance" bank differential is operated, the cams 690 will be differentially positioned by the shaft 213, gear 687 and gear 688. The cams 690 are so designed that they will rock the lever 686 counterclockwise (Fig. 28) different distances, depending on the columns selected by the "Balance" bank. This movement is transferred through link 685 and lever 684 to the bar 679 and shield 676 fast thereto so that the shield will be correctly positioned.

*Lower platen restoring mechanism*

After the selected lower platens have been operated they drop back and rest upon the yoke 648. If they are permitted to remain in this position it might happen that upon the next operation of the machine the left hand ends of the bell cranks 667 would fail to engage the pins 666 when these bell cranks were positioned to select the platens for said next operation. Mechanism is, therefore, provided to raise all of the platens to their normal positions at the beginning of an operation in order to insure their proper selection by the bell crank levers 667. Each of the platen-carrying levers 647 has a rigid arm 700. A yoke 701 supported by an arm 702 and a lever 703 (Fig. 32) is adapted to cooperate with the left hand ends of the arms 700 and normally rests just above them. The lever 703 carries a pin 704 (Fig. 29) which projects into a cam groove 705 in a cam disk 706 fast on the shaft 316. This disk is rotated in a counter-clockwise direction upon each operation of the machine, and the cam groove 705 is so shaped as to first rock the lever 703 and thereby the yoke 701 clockwise (Fig. 29). This will bring the yoke into engagement with the left hand ends of the arms 700 and rock all of the platen-carrying arms counter-clockwise far enough to insure that the pins 666 will be engaged by the bell crank levers 667. This position of the yoke 701 is held for a sufficient length of time for the platens to be selected for the next operation, whereupon the cam groove 705 rocks the lever 703 counter-clockwise beyond its normal position to provide a clearance between the yoke 701 and the ends of the arms 700 when the platens are lowered before taking an impression. Near the end of the operation the yoke 701 is returned to its normal position, shown in Fig. 29.

*Manual control of lower impression mechanism*

On certain operations of the machine, such for instance as when totals of the various totalizers are taken by the night auditor it is desired to print the amounts thus set up on a single card only. Mechanism is, therefore, provided whereby only one impression will be made by the selected platens. A knurled knob 710 (Figs. 21, 23 and 33) is fast on the forward end of a sleeve 711 which surrounds the sleeve 554 above described. Fast on the inner end of the sleeve 711 is a gear 712 which cooperates with a gear 713 fast on the sleeve 558 surrounding shaft 526. This sleeve has a curved slot 714 formed therein into which projects a pin 715 carried by a hub 716 loosely mounted on the sleeve 558 (Figs. 21, 23 and 32). Integral with the hub 716 is an arm 717 which is bifurcated and partially surrounds a flanged collar 718 (Fig. 30) integral with the disk 660 above described. It will be recalled that this disk 660 has two cams 658 and 659 which cooperate with the arm 655 and other mechanism to give the selected lower platens two operations. It can be seen from Fig. 32 that the cam 659 which is visible in this view is slightly less than half as wide as the disk 660. The other cam 658, however, is approximately twice the width of the cam 659.

When only one card is to be printed upon by the lower impression mechanism the knob 710 is given a quarter turn in a counter-clockwise direction, which, through the sleeves 711, gear 712, and gear 713, will rotate the sleeve 558 in a clockwise direction. The curved slot formed in the sleeve 558 is so designed that this movement of the sleeve will cause the hub 716 to be slid toward the right, as shown in Fig. 23. As this hub carries the arm 717, which meshes with the flanged disk 718, this disk and the disk 660 which is secured thereto will be slid forwardly on the shaft 316 a sufficient distance to move the cam 659 out of the path of the arm 655. Therefore, when the shaft 316 is given its rotation, as above described, only the cam 658, which it will be remembered is twice the width of the cam 659, will be in position to co-operate with the arm 655, and thereby give the yoke 648 and the selected lower platens a single operation in the manner above described.

*Disabling lower impression when no cards are in the machine*

This machine is provided with the well known mechanism for preventing the operation of the lower hammers when there are no cards in the machine. The mechanism used herein is identically the same as that shown and described in the previously mentioned application of the present applicant, No. 610,273, and, therefore, only a very brief description thereof will be given herein. Fast on the shaft 316 is a cam 720 (Fig. 29) which has a high spot normally engaging a roller carried by a pitman 721 adapted to slide on the shaft 316. At its opposite end the pitman 721 is pivoted to an arm 723 fast on a shaft 724 supported by the frames 310 and 311. Loosely mounted on a stud 725 is an arm 726 having an upwardly extending feeler finger adapted to come into contact with the under side of the card if a card is in the machine. The arm 726 has a notch 727 which cooperates with a pin carried by the pitman 721. A spring 728 is stretched between a pin on the pitman and a pin on the frame so that the pitman tends to move constantly toward the right and the arm 726 tends to rock counter-clockwise about its pivot 725. The pitman is held in its normal position, however, until the beginning of an operation, when it is allowed to move to the right under the influence of the spring 728. This will raise the upwardly extending feeler finger of the arm 726, and if a card is in the machine the movement of the above mechanism will be stopped when the finger 726 strikes the under side of the card. If, however, no card is placed in the machine the movement of the pitman toward the right and the movement of the arm 726 upwardly will continue to the extent of the slot in the pitman through which the shaft 316 extends.

When the pitman 721 is given its full extent of movement toward the right, due to the fact that there is no card in the machine, the arm 723 and shaft 724 are rocked counter-clockwise. Also fast on the shaft 724 is an arm 730 (Fig. 30) to which is pivoted a link 731 which at its opposite end is pivotally connected to an arm 732 carrying a pin 733 extending through a slot formed in an upwardly extending portion of the link 652. It will be remembered that this link 731 drives the yoke 648 to operate the selected platens. When, however, the shaft 724 is rotated counter-clockwise, as above described, the arm 730, link 731, and arm 732 will be rocked counter-clockwise, which, through the pin 733, will raise the link 652 far enough to remove the slot 651 therein from the rod 650 carried by the yoke arms 640 and 649 and, therefore, when the link 652 is moved toward the left to stretch the spring 661 to take an impression the yoke will not be moved.

Means are provided for moving the arm 726 back to its normal position in order to prevent any interference by this arm with the printing or ejecting of the cards when a card is in the machine and the arm 726 moves upwardly until stopped by the card. A slide 735 is mounted on the arm 723 and is normally held in the position shown in Fig. 29 by means of a spring 736 extending between a pin on arm 723 and a pin on slide 735. Another pin 737 is carried by the slide 735, and lies in the path of a pawl 738 carried by an arm 739 fast on a shaft 740. This pawl cannot rock clockwise due to a pin carried thereby engaging a shoulder on said arm. The pawl is free, however, to rock counter-clockwise against the tension of a spring 741 stretched between the pin on said pawl and an extension of the arm 739. The shaft 740 is rocked counter-clockwise near the beginning of the operation of the machine by means to be later described, and if the shaft 724 is rocked only a short distance due to the engagement of the finger on the arm 726 with the cards the pawl 738 contacts the pin 737 and rocks the parts back to normal positions where they are held until near the end of the operation, when the cam 720 picks up the roller on the pitman 721 and holds the parts in normal positions.

If there are no cards in the machine, the pin 737 is moved out of the path of movement of the pawl 738, which is, however, rocked as usual. The shaft 724 is returned to normal at the same time that the shaft 740 is rocked clockwise to normal, and, therefore, when the pawl 738 moves upwardly it will strike the pin 737 but the pawl is flexible in this direction and can wipe by the pin 737 to its normal position.

*Card tension mechanism*

After the cards are in the machine, mechanism is provided to hold the upper card against movement during the time it is being printed upon. In order to accomplish this, there are two pairs of knurled rollers which are normally separated but which can be brought together to hold the card against movement. The lower roller 750 of each of these pairs (Figs. 49 and 52) is fast on a hub 751 which is slidable on, but keyed to, the shaft 592. The hubs 751 are located between the bearings 591 for the carriage and a spacing sleeve 589 (Fig. 47) which surrounds the shaft 592 and extends between the hubs 751. The rollers 750 are, therefore, shifted laterally of the machine with the carriage. As can be seen in Fig. 47, these rollers extend upwardly through openings in the card table 590 and cooperate with smaller rollers 752 loose on pins 753 carried by arms 754. These arms are pivoted on a shaft 755 rotatably mounted in bearings 756 depending from the card table 590 (Figs. 47, 48 and 49). Each of these arms 754 carries a pin 757 (Fig. 52) about which is hooked one end of a torsion spring 758 surrounding the shaft 755. The opposite ends of these springs are hooked over pins carried by arms 749 pinned to the shaft 755 and having slots through which the pins 757 carried by arms 754 project. It is evident from the above that if the shaft 755 is rocked clockwise (Fig. 52), the arm 754 will also be rocked clockwise by means of arms 749, spring 758 and pin 757, which movement will rock the upper knurled rollers 752 against the lower rollers 750 and hold the card tightly against movement. The upper card is made longer than the lower card so that the rollers 752 and 750 will engage the top card, but not the bottom card.

The mechanism for rotating the shaft 755 to move the pairs of rollers into contact with each other will now be described. Fast on the shaft 755 are two arms 759 which support a rod 760. A lever 761, pivoted on a stud projecting from the bracket 593, carries two pins 762 (Figs. 47 and 48), one on each side of the rod 760. The lever 761 has a slot 763 cut therein through which projects a pin 764 carried by an arm 765 fast on the shaft 740. This shaft is given a counter-clockwise rotation (Fig. 48) upon every operation of the machine by a mechanism to be later described. This will move the pin 764 in the slot 763 of lever 761, and, due to the shape of this slot, the lever will be rocked counter-clockwise and then clockwise, which will, through pins 762, rock rod 760, arms 759 and shaft 755 clockwise (Fig. 52) and move the upper rollers 752 into contact with the lower rollers 750. The shaft 740 is rocked first at the beginning of the operation and back to normal near the end thereof so that the tension is maintained on the card during nearly the complete operation of the machine.

*Card ejector*

After the upper card has received its impression from the lower type-wheels it is ejected from the machine so that upon the next operation of the platens the same impression may be taken upon the lower card. It will be remembered that the card is held between the two pairs of knurled rollers 752 and 750. It is apparent, therefore, that in order to eject the card all that is necessary is to give the larger one of these rollers in each pair a rapid counter-clockwise rotation, as seen in Fig. 49. It will also be remembered that the larger roller 750 of each pair is slidably mounted upon the shaft 592 to which it is keyed. Therefore, if the shaft 592 is given a counter-clockwise rotation, both the rollers 750 and 752 will be rotated, no matter in what position on the shaft the carriage may be located.

The means for giving the shaft 592 a counter-clockwise rotation will now be described. Loose on the printer drive shaft 316 (Fig. 34) is a disk 767 which carries a pin 768. This pin extends through a disk 794 fast on the shaft 316, and is adapted to cooperate with a Geneva wheel 769 loose on the shaft 437. Secured to the Geneva wheel is a gear 770 (Figs. 32 and 47) which meshes with a gear 771 loose on the shaft 316. Secured to the gear 771 is a larger gear 772 which meshes with a gear 773 fast on a sleeve 774 surrounding the shaft 437. Also fast on the sleeve 774 is a gear 775 which meshes with a gear 776 loose on the shaft 316. Fast to the gear 776 is a spiral gear 777 (Figs. 32 and 47). The gear 777 meshes with a spiral pinion 778 fast on a short shaft 779 (Figs. 21 and 49) carried by a bracket 780 projecting from the frame 310. Also fast on the shaft 779 is a gear 781 which meshes with a gear 782 fast on the left hand end of the shaft 592. It can be seen from the above that, when the shaft 316 has received slightly more than one-half of a rotation, the pin 768 extending through disk 794 co-operates with one of the slots in the Geneva wheel 769 and thereby rotates this wheel until the pin 768 is disengaged therefrom. This partial rotation of the Geneva wheel 769, through the gearing already described, will rotate the shaft 592 and the two knurled rollers 750 counter-clockwise and the rollers 752 clockwise (Fig. 52) at a very rapid rate of speed in order to quickly eject the card from the machine after it has received its impression.

The Geneva wheel 769 is held against rotation, except when engaged by the pin 768, by a Geneva stop wheel 790 (Figs. 32 and 34) secured to the disk 794. As the pin 768 engages the wheel 769 a notch 791 in the wheel 790 is presented to the wheel 769 thus unlocking the same and permitting it to be turned one step by the pin 768. As the pin leaves the wheel 769, the periphery of the Geneva stop wheel 790 again locks the Geneva wheel 769.

*Disabling ejecting mechanism*

Whenever the knurled knob 710 is turned to the one-card position and the mechanism above described is operated to cause only one impression to be taken from the type-wheels, it is also desirable to disable the card ejecting mechanism, as it will not be necessary to eject the card on such operations. The means for accomplishing this will now be described. It will be remembered that the sleeve 558 (best shown in Fig. 23) will be rotated a quarter turn in a clockwise direction by the movement of the knob 710 to the single card position. Slidably mounted upon the sleeve 558 is a hub 783 exactly the same as the hub 716 before described. This hub 783 carries a pin 784 projecting into a slot in the sleeve 558. Therefore, when the sleeve 558 is rotated, the hub will be moved rearwardly to the extent of the said slot. Integral with the hub 783 is an arm 785 (Fig. 34) having a bifurcated end adapted to partially surround and co-operate with a flanged disk 786 slidably mounted on the main drive shaft 316. The disk 786 is secured to the disk 767 which carries the pin 768 for operating the card ejecting mechanism. It can be seen, therefore, that when the hub 783 and arm 785 are moved toward the rear, the pin 768 will be moved out of the plane of the Geneva wheel 769, and when the disk 794 is rotated, the pin will not engage said Geneva wheel and the said ejecting mechanism will not be operated.

In order to maintain the said Geneva wheel 769 in position while the card ejecting mechanism remains disabled, the wheel is rigidly connected by a sleeve 787 with a disk 788. This disk is formed to cooperate with the periphery of disk 767 (Fig. 34) so that when disk 767 is moved laterally into engaging position with disk 788, any rotation of this disk 788, sleeve 787 or Geneva wheel 769 will be prevented. When the parts are moved to the positions shown in Fig. 32, the disk 767 will be disengaged from disk 788 at the same time that the pin 768 is again moved into cooperative relation with the Geneva wheel 769.

*Key release for line selecting mechanism*

The key 608 (Fig. 48) which has been depressed to select the line upon which the printing is to be done will remain in its depressed position, and thereby maintain the carriage in the proper position until the end of the operation on which the balance is printed. Near the end of this operation the depressed key is released and returned to its normal position. This release of the depressed key will permit the spring 623 to return the carriage to its extreme left hand position, in which it will remain until the next operation of the machine. The mechanism for causing the release of the depressed line selector key will now be described.

Upon an operation in which a balance is printed the total lever 70 is moved. The movement of this lever will, through means to be later described, rock the shaft 55 (Figs. 20 and 21) in a counter-clockwise direction. Fast to the extreme left hand end of this shaft is an arm 796 which carries at its lower end a pin 797 projecting through a slot 798 in one arm of a bell crank lever 799 which is pivoted to a projection on the bracket 567. At its lower end the other arm of this bell crank lever is pivoted to an arm 789 (Figs. 26, 32 and 36) pinned to the end of a rod 800 which is slidably supported by the bracket 567 (Fig. 26) at its rear end, and at its forward end by a bracket 801 (Fig. 21) secured to the frame 310. At its forward end the rod carries a segment 802 (Figs. 24 and 32) which normally lies between two ears 803 projecting from a yoke 804 loosely mounted on the shaft 560. At its forward end the yoke is integral with an arm 805 which carries a pin 806 projecting through the bifurcated end of an arm 807 fast on a short shaft 808 supported by a bracket 575 secured to the plate 598 (Figs. 22, 24 and 51). Also fast on the shaft 808 is a short arm 809 carrying a pin 810 which normally lies just beneath the lower edge of a bar 811 (Fig. 22) which is slidably mounted on two studs 812 carried by lugs 813 depending from the guide-plate 594. As can be seen in Fig. 51, the bar 811 contacts a projecting ear 814 of the detent 614 for the line selector keys.

An arm 815 (Figs. 24 and 32) is fast on the printer drive shaft 316, but is normally out of the plane of an arm 816 integral with the yoke 804. However, when the total lever is moved to the balance position, as above described, and the rod 800 is moved rearwardly, the arm 816 of the yoke 804 will be moved into the path of the arm 815. It can, therefore, be seen that when this arm 815 is given its counter-clockwise rotation (Fig. 24) it will, near the end of this rotation, come into contact with the end of the arm 816 and rock this arm and the yoke 804 clockwise. This movement of the yoke will cause the arm 807, shaft 808 and arm 809 to be rocked counterclockwise, due to the slot and pin connection therebetween, which movement will cause the pin 810 to raise the bar 811 (Fig. 22). The bar 811 has slots cut therein which surround the pin 812 and these slots are cut at an angle to the perpendicular so that when the bar 811 is raised it will also be forced toward the left, as seen in Fig. 22. This will cause the end of the bar 811 to strike the ear 814 of the detent 614 and move this detent also toward the left (Fig. 51) a sufficient distance to release the depressed key and permit its spring 613 to return it to its normal undepressed position, whereupon the spring 623 will return the carriage to its normal left hand position, as shown in Fig. 48. A spring 818 (Fig. 24) attached to the arm 807 will cause this arm and the yoke 804 to return to their normal positions after the end of the arm 815 has passed the end of the arm 816. These are the normal positions of these parts.

Ribbon mechanism

Any suitable form of ink ribbon may be used with the present invention, and, therefore, no specific description of the ink ribbon or its method of operation will be given herein. The type of ribbon used in the previously mentioned patents and application is thought to be most adaptable for use with this machine, and reference may be made to these patents and application if a specific description thereof is desired. As indicated in Fig. 26, an ink ribbon 820 passes about an inking roller 821, of felt or any other suitable material, and then extends to the left about the upper type line, then passes downwardly and beneath the lower type line, and back to the inking roller. Two metal shields 822 are provided to prevent any of the type-wheels being inked except those at the printing line.

Total and sub-total operations

In totalizing operations a selected totalizer is moved into engagement with the actuating racks 186 before said racks are moved by the segments 190 and latches 191, whereby the differential movements of the racks 186 is controlled by the totalizer pinions 188. After the actuators have been moved differentially under the control of said totalizer pinions the totalizer is disengaged from the actuator, thereby leaving the totalizer at zero.

In sub-totalizing operations the totalizer is engaged with the actuators before the actuators are moved differentially and held in engagement with said actuators to control the differential movements thereof to print a sub-total. The totalizer is also held in engagement with the actuators while they are being returned to normal, thereby restoring to the totalizer the amount which was taken therefrom.

The mechanism whereby the said totalizer controls the differential movements of the actuators during total or sub-total operations will now be described.

As there are three totalizer lines, there are three trains of mechanism for connecting the totalizers with the differential mechanism, but as these trains of mechanism are identical, only one has been shown herein. Fast on a shaft 830 (Fig. 2) is a partial gear 831 whose teeth mesh with a segment 832 pivoted on a stud 833 in the differential unit supporting plates or hangers. Each of the segments 832 has an arm 834 having a bifurcated end through which a pin 835 projects. The pin 835 is carried by a link 836 pivoted to an arm 837 fast on a sleeve surrounding the stud 833. Also pivoted on the stud 835 is a link 838 pivoted to a lever 839, pivotally mounted on a stud 840 in the differential unit supporting plate. This lever 839 carries a half-round stud 841, which is adapted to cooperate with teeth 842 on the inner periphery of a reset spider 843 loosely mounted on the stud 184.

One of the shafts 830 is adapted to be rotated slightly in a counter-clockwise direction (Fig. 2) upon totalizing operations, depending upon the adjustment of the total lever 70. This movement of the shaft 830, through gear 831 and segment 832, will straighten the toggle formed by links 836 and 838.

Fast on the sleeve which supports the arm 837 is an arm 844. When the shaft 830 and partial gear 831 are rocked, as previously described, the arm 844 is rocked clockwise, upon the straightening of the toggle formed by links 836 and 838, by the segment 832 into the path of a long tooth 845 carried by each totalizer pinion in its zero position. When, therefore, the selected totalizer wheels 188 are rocked into engagement with the actuators and rotated to their zero positions, the long teeth 845 will strike the arms 844, and through arms 837 and links 836 and 838 rock the lever 839 clockwise (Fig. 2) and cause the half-round stud 841 to engage one of the teeth 842 of the spider 843. This spider has an arm 846 integral therewith, having a slot 847 through which projects a pin 848 fast in the end of bell crank lever 193 (Fig. 8), which carries the latch 191 so that the reset spider 843 is moved with the actuator 185 and racks 186. It can be seen, therefore, that when the movement of the spider 843 is arrested, as above described, the latch 191 will be broken.

On total-taking operations the totalizer wheels are then disengaged from the actuators, as they are at zero, but on sub-total operations the totalizer wheels remain in mesh with the actuators, thus allowing the amounts taken off of them to be replaced. When the totalizer is disengaged a spring 850 extending from the lever 839 to a suitable point of the mechanism, rocks said lever 839 counterclockwise to normal position thereby disengaging the stud 841 from the tooth 842 of the spider 843.

At the end of the totalizing operation the shaft 830 and partial gear 831 are rocked clockwise, and rock the segment 832 counterclockwise to normal, thereby lowering the arm 834 and rocking the link 836 counterclockwise to its normal position. This movement of the segment 832 also rocks the link 838 clockwise to normal position.

Should the totalizer be in the zero position when it is rocked into engagement with the racks 186, the long teeth 845 of the totalizer pinions will immediately strike the arms 844. When this occurs, the clockwise movement of the segments 832, through the engagement of their arms 834 with the studs 835, straightens out the links 836 and 838 and immediately rocks the lever 839 clockwise, whereby the stud 841 engages with the tooth 842 in the zero position. Consequently the latch is disconnected from the driver at zero and the segment 234 and spider 843 are not moved beyond zero position.

*Mechanism for breaking the differential latch in the balance position on totalizing operations*

It will be remembered that when a balance is taken, only the total lever is moved, and it is, therefore, necessary to provide mechanism for disconnecting the latch of the balance bank on such an operation. In order to accomplish this, an arm 857 (Fig. 13) is provided, which is loose on the shaft 287. A spring 858 is stretched between a pin on the arm 857 and the shaft 220 which tends to rock the arm 857 constantly in a counter-clockwise direction. This arm, however, is normally maintained in the position shown in Fig. 13 by a lug 859 carried by the total lever plate 71 (Fig. 20), upon which normally rests a pin 860 carried by the arm 857. As before described, the balance bank differential mechanism is equipped with a bell crank lever 300 which is carried with said mechanism upon its clockwise movement. If the total lever is in its adding position the upper end of the bell crank lever will pass just beneath a continuation of the pin 860 on the other side of arm 857, as seen in Fig. 13. If, however, the total lever is moved to its balance position, the lug 859 will be moved away from beneath the pin 860, which will permit the spring 858 to rock the arm 857 counter-clockwise far enough to bring the extension of pin 860 into the path of the upwardly extending arm of the bell crank lever 300. When this occurs, the upwardly extending arm of this bell crank will come into contact with the said extension of pin 860 and the differential latch for the balance bank will be broken in the sixth position. If, however, the total lever is moved to its second or third position below adding, the lug 859 will come into contact with the plate 861 and rock the arm 857 clockwise to its normal position, in which the extension of pin 860 will not disconnect the latch. When the arm 857 is permitted to be rocked counter-clockwise by the movement of the total lever its movement will be limited by the engagement of the pin 860 with the differential unit supporting frame, only a small section of which is shown in Fig. 13.

*Mechanism for disabling zero stop pawls on totalizing operations*

As the amount differentials are adapted to be disconnected from their drivers in the position corresponding to the amounts standing on their corresponding totalizer wheels in totalizing operations, it is necessary to provide mechanism for rocking the zero stop pawls out of operative positions on totalizing operations. This is accomplished by the movement of the total lever 70. When the total lever 70 is moved to one of its totalizing positions the plate 71, which is integral therewith, is rotated either clockwise or counter-clockwise, depending upon whether a total or sub-total is desired. The plate 71 has a slot 864 into which projects a roller 865 carried by one arm 866 of a lever 867 (Fig. 20). In the normal adding position of the total lever the slot 864 has a high spot cooperating with the roller 865. When the total lever is moved to any of its totalizing positions, however, the roller 865 is moved into a low spot of the slot, which movement will rock the lever 867 counter-clockwise. An arm 868 is pivoted on a shaft 869 and is connected to the lever 867 by means of a spring 870 in a manner well known in the art. The arm 868 has a slot 871 with which a roller 872 carried by an arm 873 cooperates. The arm 873 is fast on the shaft 55, before mentioned. It can be seen from Fig. 20 that when the lever 867 is rocked counter-clockwise, due to the movement of the plate 71, this movement will be transmitted to the arm 868 by means of the spring 870. Due to the shape of the slot 871 formed in the arm 868, the arm 873 and shaft 55 are rocked slightly clockwise to move a rod 875 (Fig. 2) just into contact with the previously described arms 42.

Fast on the shaft 41, which carries the zero stop pawls 40 for the amount banks, are the arms 42, (Fig. 2) one for each of the banks of amount keys. Cooperating with these arms 42 is a rod 875 carried by a plurality of arms 876 fast on the shaft 55 (Fig. 2). As can be seen from this figure, when the shaft 55 is given its clockwise movement during the operation of the machine, the rod 875 will rock these arms 42, the shaft 41 and the zero stop pawls 40 counter-clockwise far enough to render the pawls ineffective. It is also necessary to rock out the zero stop pawl for the balance bank, as this bank is selected for operation when only the total lever is moved, and the ordinary means for rocking out the zero stop pawl—that is, by depression of a key—cannot be used. Therefore, the zero stop pawl 64 (Fig. 59) for the balance bank has an extension carrying a pin 878 which is adapted to cooperate with an arm 879 fast on the shaft 55 and when the shaft 55 is given its clockwise movement, the zero stop pawl 64 for the balance bank will also be rocked out of its effective position.

Mechanism for limiting the printer drive shaft to one rotation

Fast on the shaft 55, above mentioned, is a lever 880 (Fig. 18), connected by a link 881 to an arm 882 loose on the rod 211. Another arm 883, also loose on this rod but rigidly connected to the arm 882 by a yoke 884, has a downwardly extending nose 885 which is adapted to cooperate with the upper end of the driving pawl 319 for the printer drive shaft 316. It will be remembered that the shaft 316 is driven by the pawl 319 in cooperation with a boss 323 on the shaft, the pawl 319 being carried by the disk 318, which is in turn driven by the sleeve 315, spiral pinion 314 and spiral gear 313 fast on the main drive shaft 26 of the machine. When the total lever is moved out of its adding position, means are provided for rocking the arm 882, yoke 884 and arm 883 counter-clockwise (Fig. 18) far enough to bring the downwardly extending nose 885 of the arm 883 into the path of the pawl 319. Thus, when the disk 318 commences its counter-clockwise rotation to drive the printing mechanism, the upper end of the pawl 319 will strike the nose 885 of the arm 883, and will thereby be disengaged from the boss 323 so that the printing mechanism is not driven. Before the disk 318 reaches or commences its second rotation, the nose 885 of the arm 883 will have been moved away from the pawl 319 so that the pawl may resume its normal position, as seen in Fig. 19, whereupon the shaft 316 and the printing mechanism will be given one cycle of operation.

Mechanism for disabling slip printer on totalizing operations

On totalizing operations there is no slip inserted in the machine, and it is, therefore, desirable to limit the operation of the upper impression mechanism to the one operation required to print on the audit strip. This is accomplished in the following manner. It will be recalled that in order to disable the slip ejecting mechanism and cripple the impression mechanism, it is necessary to slide the shaft 526 (Fig. 32) toward the front a sufficient distance to leave only the long pin 454 in the plane of the Geneva wheel 452 and to remove the pin 530 (Fig. 39) from the cam slot in the disk 532. It will also be recalled that if either of the hooks 543 or 544 (Figs. 22 and 25) is permitted to rise and engage the pin 549, the shaft 526 will be slid as above described.

Fast on the shaft 55 is an arm 887 (Figs. 21, 25, and 36). This arm, at its lower end, carries a pin 888 which cooperates with the upper edge of an arm 889 pivotally mounted at 890 to the side frame of the machine. This arm 889 contacts a nose 891 of the arm 565 previously mentioned. It will be recalled that this arm 565 lies just above the hook 543, and while in this position prevents the hook from being raised to engage the pin 549.

When the total lever is moved to one of its totalizing positions, and the shaft 55 is rocked in a counter-clockwise direction (Fig. 21), the pin 888 will rock the lever 889 clockwise about its pivot 890, which will cause it to rock the arm 565 counter-clockwise about its pivot 566. This movement of the arm 565 will carry it out of the path of the hook 543, and, therefore, when this hook is drawn back, as above described, it will be raised by its spring 545 and will engage the pin 549, and upon its forward movement will slide the shaft 526 and disengage the slip ejecting mechanism and cripple the slip impression means so that only one impression will be taken from the upper type line on totalizing operations.

Selection of balance platen by total lever

Mechanism is provided for always selecting the platen corresponding to the balance column in the lower impression mechanism when the total lever is moved to the balance position. This mechanism is shown in Figs. 20 and 35.

Pivotally connected to the total lever plate 71 is a link 900 which, at its lower end, is pivoted to an arm 901 fast to a spiral segment 902 loose on the rod 211. This segment meshes with a spiral pinion 903 fast on a shaft 904 supported by the printer frames 310, 311 and 312. This shaft projects forwardly, and at its forward end carries a pair of cams 905 which cooperate with two rollers 906, carried by a lever 907 loose on shaft 213. This lever 907 carries a pin 908 projecting through a slot 909 in a lever 910. In Fig. 29 there is shown the bell crank lever 667 appropriate to the balance platen, this bell crank lever being the one shown in engagement with the pin 666. This is the normal position of this bell crank lever appropriate to the balance platen.

When it is desired to take an impression in the balance column it can be seen that it will be necessary to rock the bell crank lever 667 counter-clockwise to its ineffective position in order to permit said operation. Therefore, when the total lever 71 is moved to the balance position, which is the first position below its normal adding position, the movement of the total lever plate 71 will, through the link 900 and arm 901, rock the spiral segment 902 counter-clockwise, which will rotate the shaft 904 counter-clockwise, as seen in Fig. 35. The two cams 905 are so designed that when this occurs, the lever 907 will be rocked clockwise about the shaft 213, and, due to the slot and pin connection between the lever 907 and the lever 910, this lever will also be rocked in a clockwise direction. The lever 910 carries a pin 911 which projects through a slot (not shown) in the bell crank lever 667 appropriate to the balance platen, and, therefore, the clockwise movement of the lever 910 will cause the bell crank lever 667 to be rocked counter-clockwise about the rod 668, which movement will remove the lever 667 from beneath the pin 666 and permit the balance platen to operate upon the further operation of the machine.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a cash register, the combination of a manually movable carriage, means for holding said carriage in any one of a plurality of positions, means for releasing said carriage, a manually movable lever, and a cam arm positioned by said lever to disable said holding means to permit said carriage to be returned to its normal position.

2. In a cash register, the combination of a manually movable carriage, means for holding said carriage in any one of a plurality of positions, means for releasing said holding means, comprising a driving arm and an arm adapted to be driven thereby, a lever for moving said arms into co-operative alinement for causing said holding means to release said carriage, and means for returning said carriage to normal position when so released.

3. In a cash register printing mechanism, the combination of a manually movable carriage, keys for stopping said carriage in any one of a plurality of positions, a detent for holding said carriage in its selected position, a manually movable lever, a shaft adapted to be rocked by said lever, an arm carrying a projecting pin, fast on said shaft, a pivotally mounted bell crank lever, one arm of which is slotted to receive said projecting pin, and connections between said bell crank lever and said detent whereby said detent will be moved to its releasing position under the control of said lever.

4. In a cash register printing mechanism, the combination of a manually movable carriage, keys for stopping said carriage in any one of a plurality of positions, a detent for holding said carriage in its selected position, a manually movable lever, a shaft adapted to be rocked by said lever, an arm carrying a projecting pin, fast on said shaft, a pivotally mounted bell crank lever, one arm of which is slotted to receive said projecting pin, a rod pivoted to said bell crank lever, and connections between said rod and said detent so arranged that said detent will be moved to its releasing position under the control of said lever.

5. In a cash register printing mechanism, the combination of a manually movable carriage, keys for stopping said carriage in any one of a plurality of positions, a detent for holding said carriage in its selected position, a manually movable lever, a shaft adapted to be rocked by said lever, an arm, carrying a projecting pin, fast on said shaft, a pivotally mounted bell crank lever, one arm of which is slotted to receive said projecting pin, a rod pivoted to said bell crank lever, a yoke member adapted to be actuated by said rod, and connections between said yoke member and said detent so arranged that said detent will be moved to its releasing position under the control of said lever.

6. In a cash register printing mechanism, the combination of a manually movable carriage, keys for stopping said carriage in any one of a plurality of positions, a detent for holding said carriage in its selected position, a manually movable lever, a shaft adapted to be rocked by said lever, an arm, carrying a projecting pin, fast on said shaft, a pivotally mounted bell crank lever, one arm of which is slotted to receive said projecting pin, a rod pivoted to said bell crank lever, a yoke member adapted to be slid laterally by said rod, and connections between said yoke member and said detent for moving said detent to its releasing position under the control of said lever.

7. In a cash register printing mechanism, the combination of a manually movable carriage, keys for stopping said carriage in any one of a plurality of positions, a detent for holding said carriage in its selected position, a manually movable lever, a shaft adapted to be rocked by said lever, an arm, carrying a projecting pin, fast on said shaft, a pivotally mounted bell crank lever, one arm of which is slotted to receive said projecting pin, a rod pivoted to said bell crank lever, a yoke member adapted to be slid laterally by said rod, a main operating shaft, and means carried by said shaft for rocking said yoke member to move said detent to releasing position.

8. In a cash register printing device, the combination of a manually movable carriage, keys for stopping said carriage in any one of a plurality of positions, a detent for holding said carriage in its selected position, a main operating shaft, an arm carried thereby, a yoke member, one end of which is normally out of the path of movement of said arm, and means for sliding said yoke laterally to bring the end of said yoke into the path of movement of said arm to cause the detent to be rocked to release the carriage and permit it to return to normal.

9. In a cash register printing device, the combination of a manually movable carriage, keys for stopping said carriage in any one of a plurality of positions, a detent for holding said carriage in its selected position, a main operating shaft, an arm carried thereby, a yoke member, one end of which is normally out of the path of movement of said arm, and a lever for sliding said yoke laterally to bring the end of said yoke into the path of movement of said arm to cause the detent to be rocked to release the carriage and permit it to return to normal.

10. In a cash register printing device, the combination of a manually movable carriage, keys for stopping said carriage in any one of a plurality of positions, a detent for holding said carriage in its selected position, a main operating shaft, an arm carried thereby, a yoke member, one end of which is normally out of the path of said arm, and a manually movable lever for sliding said yoke laterally to bring the end of said yoke into the path of movement of said arm to cause the detent to be rocked to release the carriage and permit it to return to normal.

11. In a machine of the class described, the combination of a plurality of platens, a manipulative device, a cam, means, including a lever connected to a bell crank and operated by said cam for selecting one of said platens for actuation, and means under control of said device for positioning said cam.

12. In a machine of the class described, the combination of a plurality of platens, a cam disk having high and low portions on its periphery, a bell crank lever adapted to co-operate with said cam to select one of said platens for operation, and a manually operated lever for positioning said cam.

13. In a machine of the class described, the combination of a plurality of platens, a cam disk having high and low portions on its periphery, a bell crank lever adapted to co-operate with said cam to select one of said platens for operation, and a manually adjustable lever directly connected to said cam so that the movement of said lever will position said cam.

14. In a machine of the class described, the combination of a platen located between the pivot thereof and a projection integral with said platen, a pin on said projection, a bell crank lever adapted to co-operate with said pin, and means for variously positioning said bell crank lever to permit or prevent the operation of said platen.

15. In a machine of the class described, the combination of a plurality of pivotally mounted platens, projections integral with said platens, each projection carrying a pin, a plurality of levers adapted to co-operate with said pins, means for positioning said levers to permit or prevent the operation of said platens, and manipulative means for controlling said positioning means.

16. In a machine of the class described, the combination of a plurality of pivotally mounted platens, projections integral with said platens, each carrying a pin, a plurality of levers adapted to co-operate with said pins, members co-operating with said levers to move them into an operative or an inoperative position, and cam means for adjusting said members.

17. In a machine of the class described, the combination of a plurality of pivotally mounted platens, projections integral with said platens, each projection carrying a pin, a plurality of levers adapted to co-operate with said pins, members co-operating with said levers, and a plurality of cam disks adapted to differentially position said levers to select a certain platen for operation.

18. In a machine of the class described, the combination of a plurality of pivotally mounted platens, projections integral with said platens, each projection carrying a pin, a plurality of levers adapted to co-operate with said pins, members co-operating with said levers, cam means adapted to select the platen for operation, and manipulative means for controlling said cam means.

19. In a machine of the class described, the combination of a plurality of pivotally mounted platens, projections integral with said platens, each projection carrying a pin, a plurality of levers adapted to co-operate with said pins, member co-operating with said levers, cam means adapted to select one of said platens for operation, differential mechanism for adjusting said cams, and manipulative means for controlling said differential mechanism.

20. In a cash register printing mechanism, the combination of a plurality of platens, projecting portions on said platens carrying pins, a plurality of bell crank levers adapted to co-operate with said pins, said bell crank levers having slots formed therein, a plurality of levers carrying pins projecting through said slots, rollers also carried by said levers, a plurality of cam disks, and means for adjusting said cam disks to render any one of said platens operative.

21. In a machine of the class described, the combination of a plurality of platens, means for normally preventing the operation of said platens, and a plurality of cam disks adapted to be differentially set to select the platen to be operated.

22. In a machine of the class described, the combination of a plurality of platens, means for normally preventing the operation of said platens, a plurality of cam disks, one for each of said platens, means actuated by said cam disks for rendering certain of said platens operative, and means for setting said disks differentially.

23. In a cash register printing mechanism, the combination of a manually movable carriage, keys for stopping said carriage in any one of a plurality of positions, a detent for holding said carriage in its selected position, a manually movable lever, a shaft adapted to be rocked by said lever, and connections between said shaft and said detent, including a rod adapted to be slid by movement of said lever, whereby said detent will be moved to its releasing position under the control of said lever.

In testimony whereof I affix my signature.

BERNIS M. SHIPLEY.